United States Patent
Yokoi et al.

(10) Patent No.: US 7,372,035 B2
(45) Date of Patent: May 13, 2008

(54) RADIOLOGICAL IMAGING APPARATUS

(75) Inventors: Kazuma Yokoi, Hitachi (JP); Hiroshi Kitaguchi, Naka (JP); Takafumi Ishitsu, Hitachi (JP); Naoyuki Yamada, Hitachinaka (JP); Kensuke Amemiya, Hitachinaka (JP); Yuuichirou Ueno, Hitachi (JP); Katsutoshi Tsuchiya, Hitachi (JP); Norihito Yanagita, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 103 days.

(21) Appl. No.: 11/206,738

(22) Filed: Aug. 19, 2005

(65) Prior Publication Data
US 2006/0043309 A1 Mar. 2, 2006

(30) Foreign Application Priority Data
Sep. 2, 2004 (JP) .............................. 2004-255297

(51) Int. Cl.
*G01T 1/24* (2006.01)
(52) U.S. Cl. ................................. 250/370.08
(58) Field of Classification Search ........... 250/370.01, 250/370.08, 370.09, 370.1, 370.13, 338.4
See application file for complete search history.

(56) References Cited

U.S. PATENT DOCUMENTS 4,727,256 A    2/1988  Kumazawa 5,138,167 A  *  8/1992  Barnes ................... 250/370.01

FOREIGN PATENT DOCUMENTS

| JP | A-61-14590 | 1/1986 |
| JP | A-61-14591 | 1/1986 |

* cited by examiner

*Primary Examiner*—Djura Malevic
(74) *Attorney, Agent, or Firm*—Dickstein Shapiro LLP

(57) ABSTRACT

In a radiological imaging apparatus, a radiation detecting section includes semiconductor detectors arranged in four columns and four rows. Each of the semiconductor detectors includes a semiconductor base material, and an anode electrode film (first electrode film) and a cathode electrode film (second electrode film) lying opposite each other so as to sandwich the semiconductor base material between them. A first conductive member is installed on each first electrode film. Second electrode films of four semiconductor detectors within a row are connected together using one second conductive member. A shaping amplifier connected to the first conductive members with a wire executes a waveform shaping process using a shaping time shorter than that of a shaping amplifier connected to the second conductive member with a wire; the first conductive members are provided for the four semiconductor detectors within a column.

20 Claims, 11 Drawing Sheets

RADIOLOGICAL IMAGING APPARATUS

BACKGROUND OF THE INVENTION

The present invention relates to a radiological imaging apparatus comprising a semiconductor radiation detector which detects incident radiation to output a detection signal for it.

Semiconductor radiation detectors using Si, Ge, or CdTe collect both plural electrons and holes resulting from ionization in the detector substance caused by radiation to generate an electric signal (generally a voltage pulse). The semiconductor radiation detectors thus obtain information on the energy and incident timing of the radiation, the number of incident radiations, and the position of incidence.

Migration of charges in the semiconductor generates signal induced charges at a signal read electrode. Accordingly, if the charges are captured or recoupled owing to the level of impurities in the semiconductor, the charges do not contribute to the radiation signal having generated the charges. The phenomenon in which the signal becomes detective by the capture or recoupling is called a capture defect.

In a semiconductor radiation detector using a compound semiconductor device such as CdTe or $HgI_2$, the mobility of holes is generally lower than that of electrons. Consequently, the time required to collect all the holes is insufficiently short compared to the lifetime of the holes before capture. When a long time is required to collect all the holes, a more serious capture defect occurs depending on the lifetime of the holes.

Since an anode collects the electrons, while a cathode collects the holes. Accordingly, when a radiation reaction position is close to the anode, the holes migrate a long distance before collection (a long time is required to collect the holes). As a result, the capture defect is most significant. In contrast, when the radiation reaction position is close to the cathode, the electrons must migrate a long distance before collection. However, owing to their high mobility, almost no capture defect occurs in the electrons. Further, only an insignificant capture defect occurs in the holes because they move only a short distance before collection.

Accordingly, the output signal varies depending on the interaction position of the radiation in the semiconductor. Different output signals thus result from the same input energy. This is a major cause of degradation of energy resolution.

To avoid the degradation of the energy resolution, a method corrects the capture defect by connecting two shaping amplifiers to the semiconductor radiation detector and using output signals from these shaping amplifiers for one radiation incidence event. That is, one of the shaping amplifiers has a shaping time that is insufficient for the charge collection time, to intentionally generate what is called a ballistic defect that is a signal defect correlated markedly with the capture defect. Thus, the pulse height values of the output signals from the shaping amplifiers are corrected for each event (see, for example, JP-A-61-14590 (Page 5, FIG. 1). This makes it possible to obtain a high energy resolution with a low applied voltage resulting in a significant capture defect, for a certain combination of mobility, lifetime, and anode-cathode distance.

JP-A-61-14591 (FIGS. 2(a) and 2(b)) describes a radiological imaging apparatus in which a plurality of semiconductor radiation detectors are arranged in a plurality of columns and a plurality of rows. In each column, the semiconductor radiation detectors contained in the column have first electrodes connected together using first interconnects. In each row, semiconductor radiation detectors contained in the column have second electrodes connected together using second interconnects. A shaping amplifier is connected to each of the plurality of first interconnects and the plurality of second interconnects. Outputs from these shaping amplifiers are input to a concurrency determining device. The outputs from the shaping amplifiers connected to the first interconnects are input to a main amplifier including an integrator and an amplifier to shape waveform and an auxiliary amplifier including a differentiator to shape waveform (the time constant of the auxiliary amplifier is smaller than that of the main amplifier). The radiological imaging apparatus described in JP-A-61-14591 compares the pulse heights of output signals from the main and auxiliary amplifiers to estimate a ballistic defect. The apparatus then uses the ballistic defect to correct the pulse height of the output signal from the main amplifier.

However, if semiconductor radiation detectors are installed in an actual apparatus, for example, a radiological imaging apparatus, it is indispensable to densely mount the semiconductor radiation detectors because of the need for both high positional resolution and high sensitivity. This makes it difficult to provide sufficient intervals between the electrodes of adjacent semiconductor radiation detectors. The inventors have thus found that this configuration may pose a new problem, that is, the occurrence of a large parasitic capacity. The occurrence of a large parasitic capacity degrades the characteristics of a process for shaping the waveform of waves from the shaping amplifiers connected to the electrodes. This precludes correction of the pulse height values of radiation detection signals.

SUMMARY OF THE INVENTION

An object of the present invention is to provide a radiological imaging apparatus which can suppress the adverse effect of the parasitic capacity that may occur between the electrodes of semiconductor radiation detectors to allow the semiconductor radiation detectors to be densely mounted.

The present invention, which accomplishes this object, is characterized in that a plurality of semiconductor radiation detectors each having a first and second electrodes provided on a semiconductor member so as to sandwich the semiconductor member between the electrodes are arranged opposite one another in a unidirectional sequence so that the first electrodes of the semiconductor radiation detectors are not electrically connected, and in that a second waveform shaping device connected to the second electrodes of the plurality of semiconductor radiation detectors electrically connected together in their unidirectional sequence which executes a waveform shaping process on outputs from the second electrodes have a shaping time for a waveform shaping process which is set shorter than that of a first waveform shaping device which executes a waveform shaping process on outputs from the first electrodes.

The present invention has been made by the inventors by finding a solution for the following problems: a large parasitic capacity may occur between the first electrodes not electrically connected together but arranged opposite one another in their unidirectional sequence and the waveform shaping device is more rapidly affected by the parasitic capacity as the shaping time decreases, resulting in a louder electrical noise.

An increase in electrical noise is avoided by setting the waveform shaping time for the second waveform shaping device shorter than that for the first waveform shaping device, the second waveform shaping device executing a waveform shaping process on the outputs from the second electrodes electrically connected together in their unidirectional sequence. The pulse height value of a first output signal is corrected on the basis of the first output signal and a second output signal. This makes it possible to improve the accuracy of the pulse height value of the first output signal and thus the energy resolution.

The present invention can thus suppress the adverse effect of the parasitic capacity that may occur between the first electrodes not electrically connected together but arranged opposite each other. Therefore, the semiconductor radiation detectors can be more densely arranged.

Specifically, the pulse height value of the first output signal is corrected by determining a capture defect on the basis of the ballistic defect, the difference in pulse height value between the first output signal and the second output signal and using the capture defect for the correction.

The present invention can suppress the adverse effect of the parasitic capacity that may occur between the first electrodes of the adjacent semiconductor radiation detectors which are not electrically connected together but which are arranged opposite each other. Therefore, the plurality of semiconductor radiation detectors can be more densely arranged.

Other objects, features and advantages of the invention will become apparent from the following description of the embodiments of the invention taken in conjunction with the accompanying drawings.

BRIEF DESCRIPTION OF THE DRAWINGS

FIGS. 3A to 3C are diagrams showing a variation in γ ray detection signal depending on the incident position of the γ ray in the semiconductor base material of the semiconductor detector, wherein FIG. 3A illustrates a γ ray detection signal obtained if the γ ray is incident immediately close to a cathode, FIG. 3B illustrates a γ ray detection signal obtained if the γ ray is incident immediately close to an anode, and FIG. 3C illustrates a γ ray detection signal obtained if the γ ray is incident between the anode and the cathode;

FIGS. 5A and 5B are characteristic diagrams showing output signal voltages output by a charge amplifier and a shaping amplifier in the semiconductor detecting device shown in FIG. 4, wherein FIG. 5A is a characteristic diagram showing an output signal voltage from the charge amplifier and FIG. 5B is a characteristic diagram showing an output signal voltage from the shaping amplifier;

FIGS. 6A and 6B are diagrams illustrating defects in the shaping amplifier, wherein FIG. 6A is a diagram illustrating a variation in the pulse height value of the output signal voltage from the shaping amplifier which is caused by a variation in shaping time and FIG. 6B is a characteristic diagram showing the relationship between the incident position of the γ ray and the output signal voltage from the shaping amplifier for each shaping time;

FIGS. 8A and 8B are characteristic diagrams showing two output signal voltages obtained using two different shaping times, wherein FIG. 8A is a characteristic diagram showing temporal variations in two output signal voltages obtained which have different pulse height values and FIG. 8B is a characteristic diagram showing temporal variations in two output signal voltages obtained which have the same pulse height value;

DESCRIPTION OF THE INVENTION

With reference to the drawings, a detailed description will be given below of the best mode for carrying out the present invention. First, the principle of a semiconductor radiation detector (referred to as a "semiconductor detector" below) will be described with reference to FIGS. 1 to 3A to 3C. Then, with reference to FIGS. 4 to 8A and 8B, description will be given of amplification and waveform shaping in a semiconductor radiation detecting apparatus (referred to as a "semiconductor radiation detecting apparatus") comprising the semiconductor radiation detector. Then, with reference to FIGS. 9 to 11, description will be given of a radiological imaging apparatus that is a preferred embodiment of the present invention.

<<Principle of Semiconductor Detector>>

Figure 1:
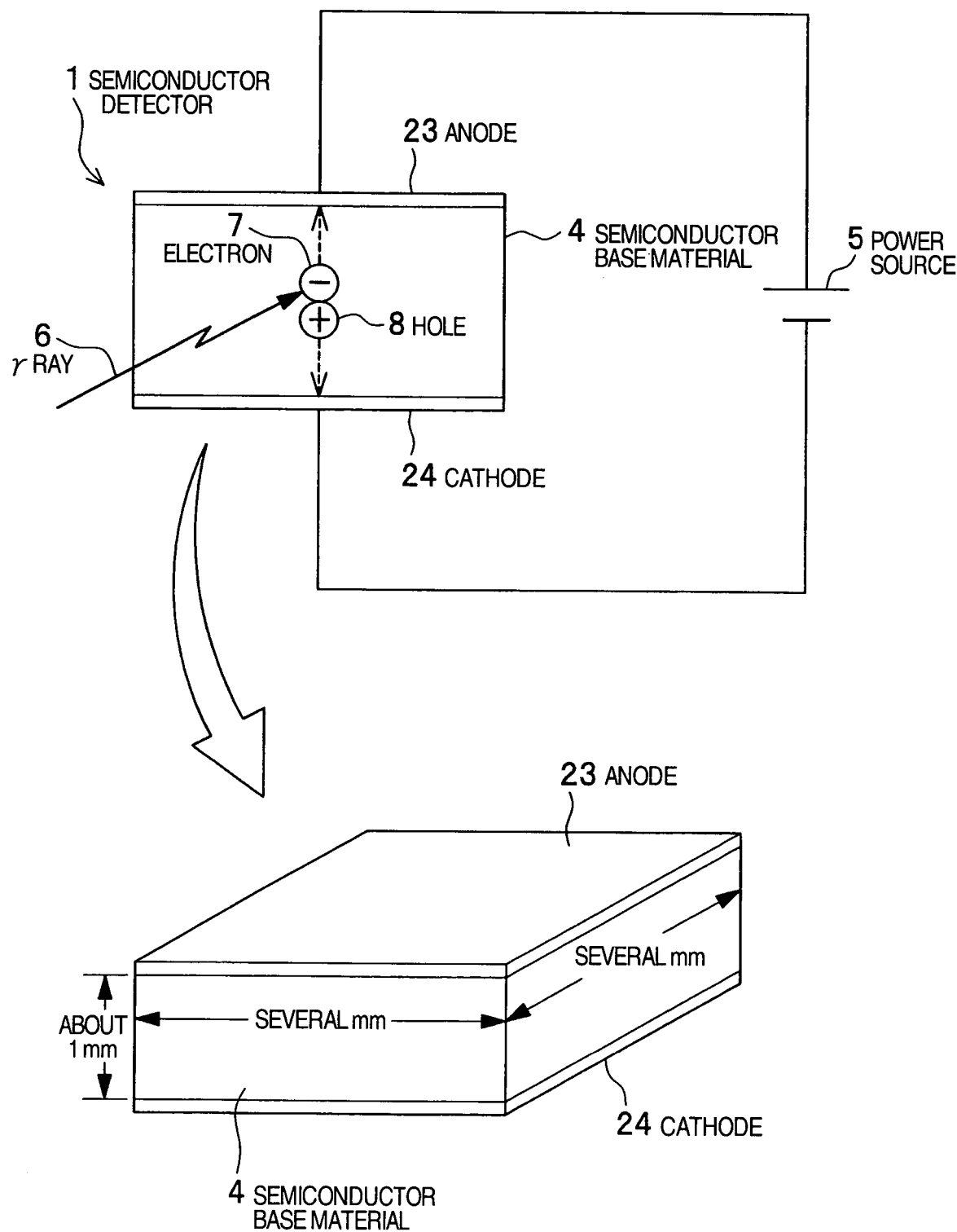
FIG. 1 is a diagram showing the configuration of a semiconductor detector used in an embodiment of the present invention.
Figure 2:
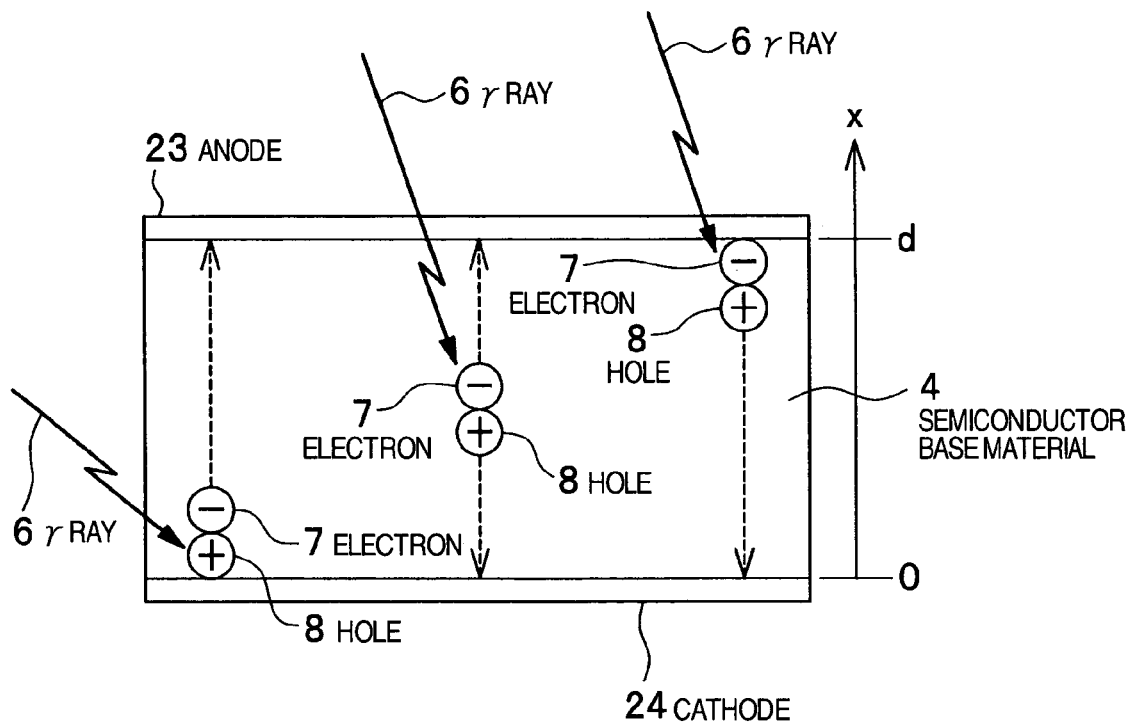
FIG. 2 is a diagram showing how charges generated operate according to the incident positions of γ rays in a semiconductor base material of the semiconductor detector in FIG. 1.

As shown in FIG. 1, the semiconductor detector 1 comprises a semiconductor base material 4, an anode electrode 23 (referred to as an electrode 23 below) and a cathode electrode 24 (referred to as an electrode 24 below) which are attached to the material 4. The electrodes 23 and 24 are connected to a high-voltage power source 5. The electrode 23 is connected to a positive side of the high-voltage power source 5. The electrode 24 is connected to a negative side of the high-voltage power source 5. The semiconductor base material 4 is interposed between the electrodes 23 and 24. The high-voltage power source 5 applies a predetermined voltage to between the two electrodes. Each of the electrodes 23 and 24 is, for example, a conductive metal plate of several millimeters×several millimeters. The semiconductor base material 4 is an element having a thickness of about 1 mm, for example. In FIG. 2 and subsequent figures, the illustration of the high-voltage power source 5 is omitted.

With the voltage applied to between the electrodes 23 and 24, γ rays 6 that are a kind of radiation are incident on the semiconductor base material 4 to cause interaction (photoelectric effect, Compton scattering, generation of electron pairs). The electrons generated are electrolytically dissociated from the semiconductor base material 4 to generate a plurality of electrons 7 and holes 8 near the site of the reaction. The electrons 7 migrate to the electrode 23. The holes 8 migrate to the electrode 24. On this occasion, as the electrons 7 separate from the holes 8, induced charges are generated in the electrodes 23 and 24. The induced charges are used as a signal by processing executed by the succeeding circuit. With a parallel plate type semiconductor detector (semiconductor detector in which the planar electrodes 23 and 24 are arranged parallel to each other), the ideal total quantity of induced charges is identical with the quantity of charges generated. The contributions of the electrons 7 and holes 8 are proportional to the distance the electrons 7 or holes 8 have migrated. Actually, a loss occurs in the induced charges resulting from the voltage of the high-voltage power source 5, the thickness of the semiconductor base material 4, and the incident positions of the γ rays 6. This results in a loss in an output signal voltage from the succeeding circuit. The loss in the output signal voltage is called a capture defect. The interaction between the γ rays 6 and the semiconductor base material 4 will simply be referred to as an incidence.

FIG. 2 shows how charges are collected depending on the incident positions of γ rays in the semiconductor base material. Let d [mm] be the thickness of the semiconductor base material 4. Let x denote the distance between the electrode 24 and the incident position of each of the γ rays 6.

If x≈0, that is, the γ ray 6 is incident immediately close to the electrode 24, the resulting electron 7 migrates a long distance to the electrode 23. A hole 8 is generated but reaches the electrode 24 quickly. The hole 8 migrates a very short distance.

If 0<x<d, that is, the γ ray 6 is incident between the electrodes 23 and 24, an electron 7 and a hole 8 are generated. The electron 7 migrates to the electrode 23. The hole 8 migrates to the electrode 24.

If x≈d, that is, the γ ray 6 is incident immediately close to the electrode 23, the resulting hole 8 migrates a long distance to the electrode 24. An electron 7 is generated but reaches the electrode 23 quickly. The electron 7 migrates a very short distance.

Figure 3A:
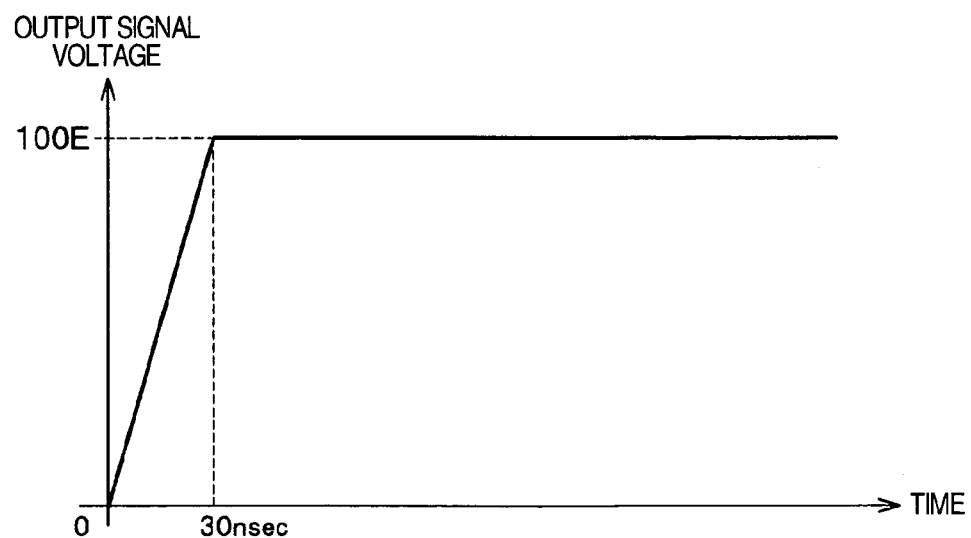
Figure 3B:
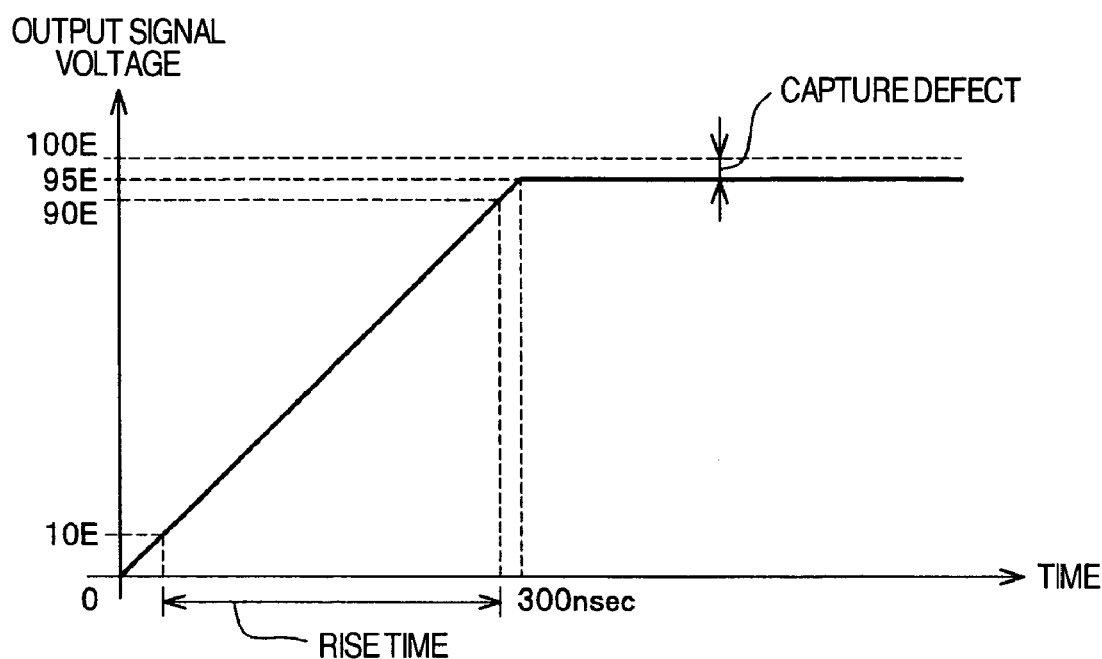
Figure 3C:
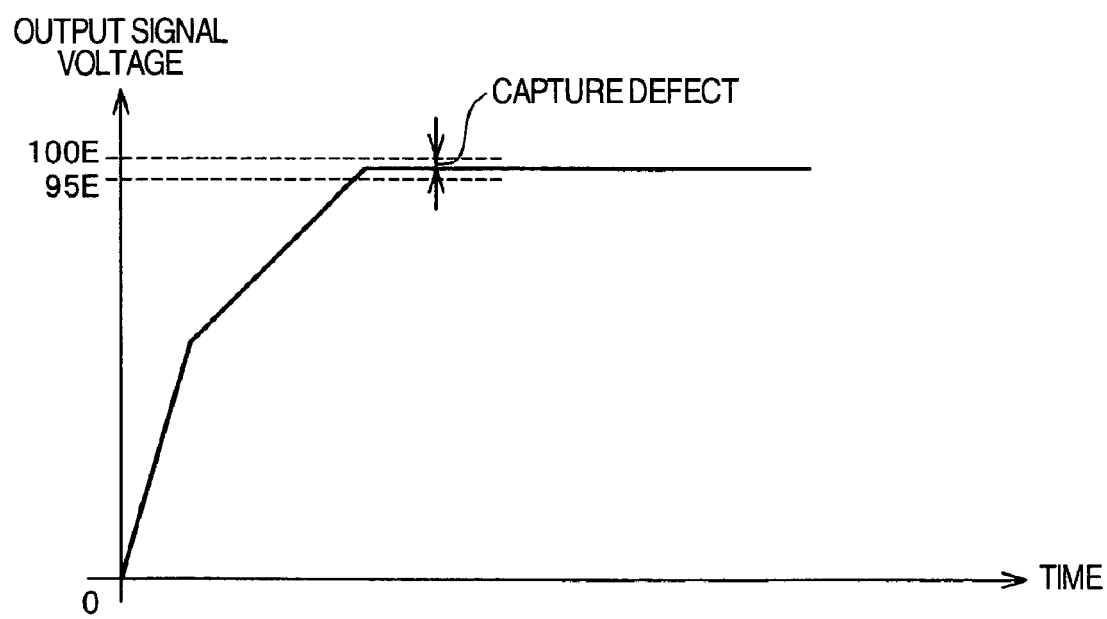

FIGS. 3A to 3C show a variation in γ ray detection signal depending on the incident position of the γ ray. The graphs in FIGS. 3A to 3C show a temporal variation in γ ray detection signal (induced charge signal); the axis of abscissa indicates time and the axis of ordinate indicates output signal voltage. When an induced charge signal is obtained the quantity of which is equivalent to the number of charges generated, that is, output signal charges without any capture loss are obtained, 100E is assumed to indicate an output signal voltage from the succeeding circuit which is proportional to the output signal charges. However, the number of charges generated is assumed to be a value obtained by simply dividing the input energy by the average electron-hole-pair generation energy. A statistical variation in the number of charges generated and the level of electrical noise are assumed to be sufficiently small.

FIG. 3A shows the case of x≈0. For x≈0, the holes 8 migrate a very short distance before they are collected by the electrode 24. Induced charges are generated only in association with the migration of the electrons 7. Since the electrons 7 have a high mobility, the time required for a signal voltage to rise has a small value (for example, 30 nsec). Therefore, the signal voltage rises to almost 100E.

FIG. 3B shows the case of x≈d. For x≈d, the holes 8 generate most of the output signal voltage. Accordingly, since the holes 8 migrate at low speed, the time required for the output signal voltage to rise has a large value (for example, 300 nsec). Further, since the holes 8 have a low mobility, some of the holes 8 are trapped while in a collection path and fail to contribute to generating induced charges. In other words, a capture defect occurs. If the induced charges have, for example, a 5% capture defect, the output signal voltage from the succeeding circuit is also subjected to a 5% capture defect. The output signal voltage is thus 95E.

FIG. 3C shows the case of 0<x<d. For 0<x<d, the signal resulting from the electron 7 is added to the signal resulting from the hole 8. Consequently, the output signal voltage has an inclination of 2 between the start and end of rising. Further, the capture defect has a value between the one for x≈0 and the one for x≈d. The output signal voltage after rising also has a value between the one for x≈0 and the one for x≈d.

Actually, it is necessary to take into account not only the mobility but also the product ($\mu\tau$) of the mobility $\mu$ and lifetime $\tau$. However, for a varying mobility, energy corrections can be used on the basis of the amount of time for shaping. Accordingly, for simplification, the discussion below involves only a difference in mobility. On the contrary, the correction method described below is not applicable if the electron and the hole have very similar mobilities with a large difference only in lifetime between them.

To correct a capture defect such as the one shown in FIG. 3B, it is common to use a rise time. To avoid the adverse effect of noise or the like, the rise time is obtained by actually measuring the time required to allow the signal voltage to account for 10 to 90% of its maximum value (pulse height value).

For example, if the rise time is 30 [nsec], the contribution of the electron 7 to the signal is considered to be 100%. Further, the capture defect is considered to be 1%. Then, a correction process is executed which the pulse height value is multiplied by (100%/99%). Further, if the rise time is 300 [nsec], the contribution of the hole 8 is considered to be 100%. Further, the capture defect is considered to be 10%. Then, a correction process is executed which the pulse height value is multiplied by (100%/90%). These correction processes provide values close to the true signal values.

When the electron and the hole have such mobilities and capture lifetimes as those with CdTe, the magnitude of the capture defect decreases when it takes the output signal voltage only a short time to rise, owing to the characteristics of the semiconductor detector 1 described in FIGS. 3A and 3B. In contrast, the magnitude of the capture defect increases when it takes the output signal voltage a long time to rise.

However, a complicated succeeding circuit is required to obtain the rise time. The method described below produces effects equal to or higher than those of the method of acquiring the rise time, using a simple circuit configuration.

<<Process for Amplification and Waveform Shaping in Semiconductor Detecting Apparatus>>

Figure 4:
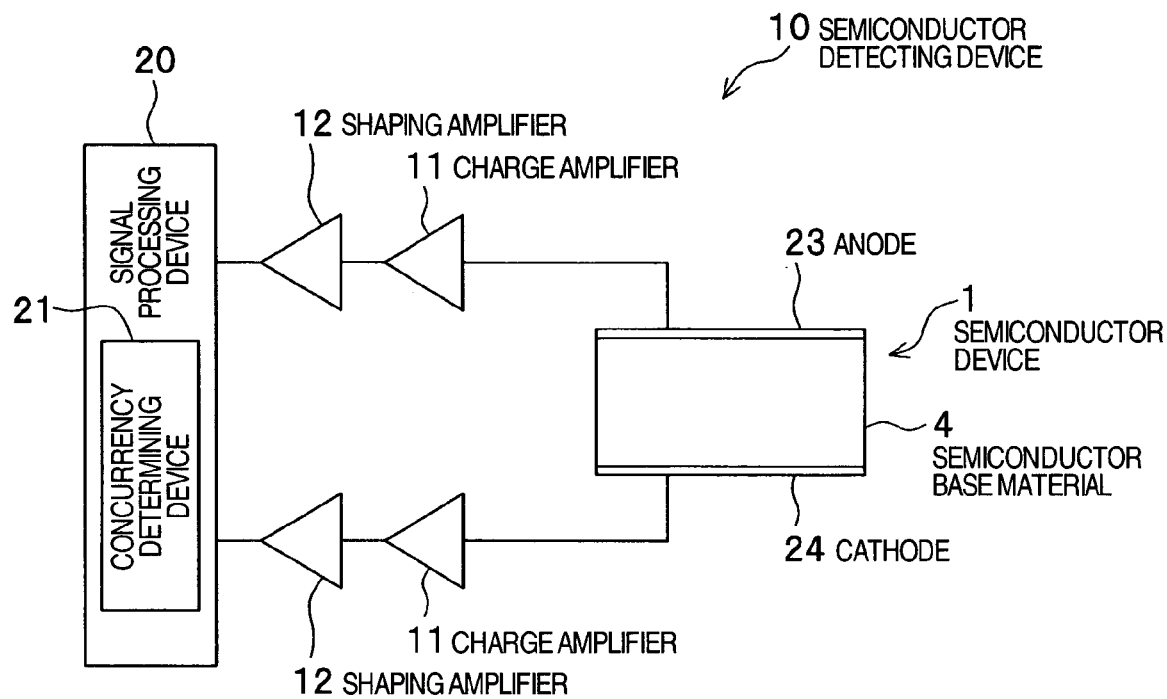
FIG. 4 is a diagram showing the basic configuration of a semiconductor detecting device used in the embodiment of the present invention.

As shown in FIG. 4, the semiconductor detecting apparatus 10 includes the semiconductor detector 1, charge amplifiers 11, 11, shaping amplifiers 12, 12, and a signal processing device 20. The charge amplifier 11 is connected to each of the electrodes 23 and 24 of the semiconductor detector 1. Each of the shaping amplifiers 12 is connected to each of the charge amplifier 11.

The charge amplifier 11 receives a γ ray detection signal (induced charge signal) output by the semiconductor detector 1 to output a signal voltage proportional to the quantity of charges in the signal. The shaping amplifier 12 is a circuit to which the output signal voltage from the charge amplifier 11 is input and which outputs an output signal voltage subjected to a predetermined waveform shaping process.

The shaping amplifier 12 is connected to the signal processing device 20. The output signal voltage from the shaping amplifier 12 is input to the signal processing device 20, which then executes a predetermined signal processing on the output signal voltage. The signal processing device 20 contains a concurrency determining device 21. FIG. 4 shows that the concurrency determining device 21 is built into the signal processing device 20. The concurrency determining device 21 can be placed outside and connected to the signal processing device 20.

The concurrency determining device 21 confirms that the same γ ray 6 results in γ ray detection signals output by the electrodes 23 and 24, by determining that the two γ ray detection signals fall within a set time range. The concurrency determining device 21 is implemented by providing hardware (called a coincidence circuit or the like) that determines the concurrency between the two detection signals in real time or adding trigger detection time information to all the signals and using software to determine the concurrency with reference to the time information. The time range used as a reference for concurrency determination must be made sufficiently small taking into account the probability at which randomly (non-periodically) incident different γ rays 6 accidentally fall within the narrow time range. Specifically, if a counting rate of 1,000 [counts/sec] is used for one pixel (a unit for the semiconductor base material with which a γ ray is detected), the time range is set at about $\frac{1}{100}$ of $\frac{1}{1,000}$ [sec], which is the average incidence interval.

The shaping amplifier 12 is a circuit that carries out amplification and waveform shaping with a good SN ratio (signal to noise ratio). Integrations and differentiations can be executed using specified time constants. However, in many cases, the integration time constant has the same value as that of the differentiation time constant. This equal time constant will be referred to as a shaping time. The other roles of the shaping amplifier 12 will be shown below.

First, the shaping amplifier 12 returns the signal voltage to a baseline (for example, signal voltage $\leq 0$) in a short time about as several times as long as the shaping time, since the incidence. This makes it possible to reduce the time for receiving adverse effect on the signal voltage of another γ ray with a different incidence time. It is thus possible to deal with frequent radiation incidences.

Second, the shaping amplifier 12 amplifies the pulse height of the output signal voltage (for example increases the voltage from several tens of mV to several V). This provides an output signal voltage that can be easily handled by the signal processing device 20.

Third, the shaping amplifier 20 smoothes the output signal voltage before and after its peak. This enables the signal processing device 20 to accurately determine the pulse height value.

The shaping amplifier 12 outputs a signal voltage proportional to the input signal voltage. Ideally, shaping output voltage signal $\propto$ charge amplifier output voltage signal $\propto$ (quantity of induced charges=quantity of charges generated) $\propto$ incident energy.

Figure 5A:
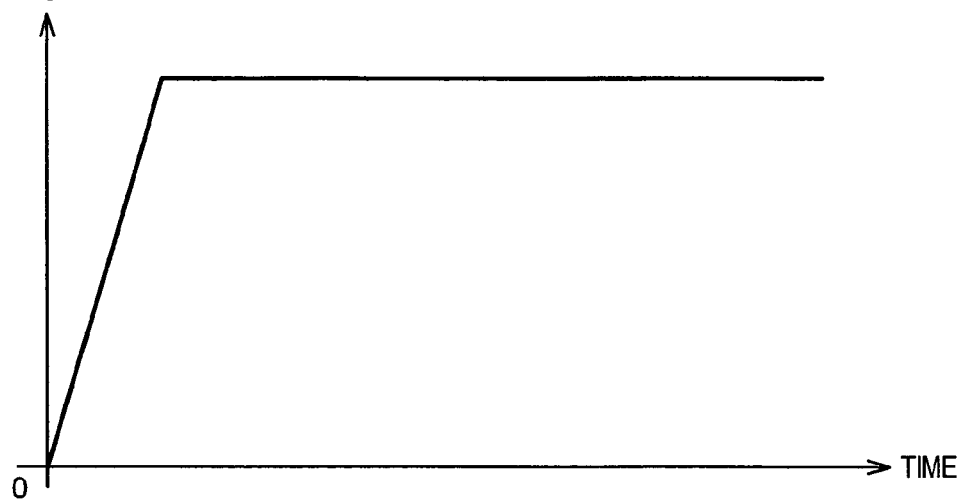

FIG. 5A shows the output signal voltage from the charge amplifier 11. The charge amplifier 11 integrates signal charges to convert them into a voltage. A temporal variation in output signal voltage is ideally the same as that in the input induced charge signal. Actually, the rise becomes slower at a few integration time constants. Discharging is carried out at a certain time constant in order to prevent the output signal voltage from being saturated. Thus, the output signal voltage from the charge amplifier 11 returns gradually to the baseline over time. By providing the shaping time with a sufficiently large time constant, it is possible to neglect a decrease in output signal voltage within the range shown in FIG. 5A.

Figure 5B:
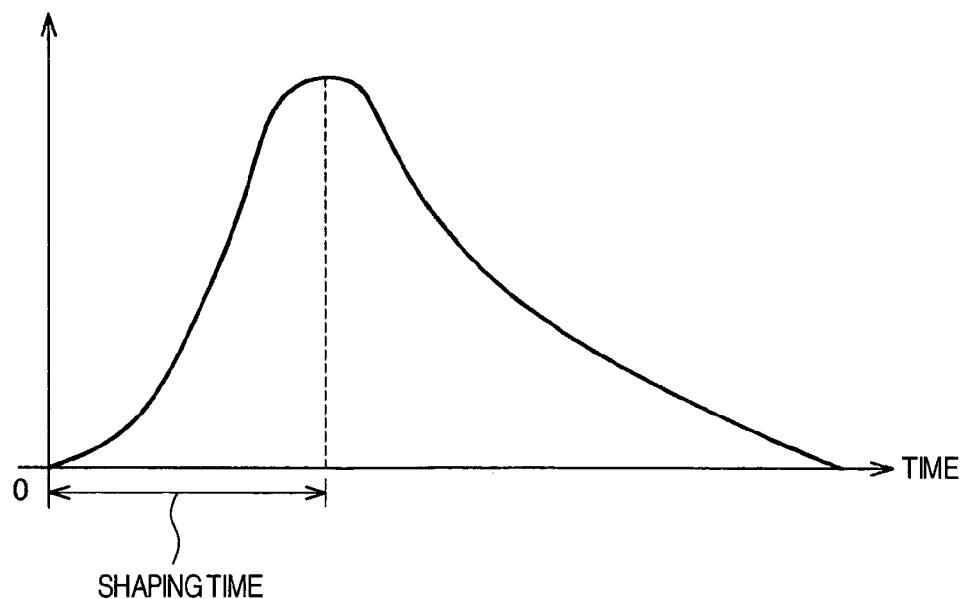

FIG. 5B shows the output signal voltage from the shaping amplifier 12. This output signal voltage is obtained by executing the waveform shaping process on the output signal voltage from the charge amplifier 11 in FIG. 5A. A common quasi-gaussian filter has a rise time almost equal to the shaping time and returns to the base line in a time several times as long as the rise time.

Description will be given of a method of estimating the magnitude of the capture defect using a plurality of shaping amplifiers. By executing a correction process on the basis of the estimated magnitude of the capture defect, it is possible to obtain an output signal that is well proportional to the incident energy, that is, an output signal having a high energy resolution. Description will be given of a method for estimating the magnitude of the capture defect.

Figure 6A:
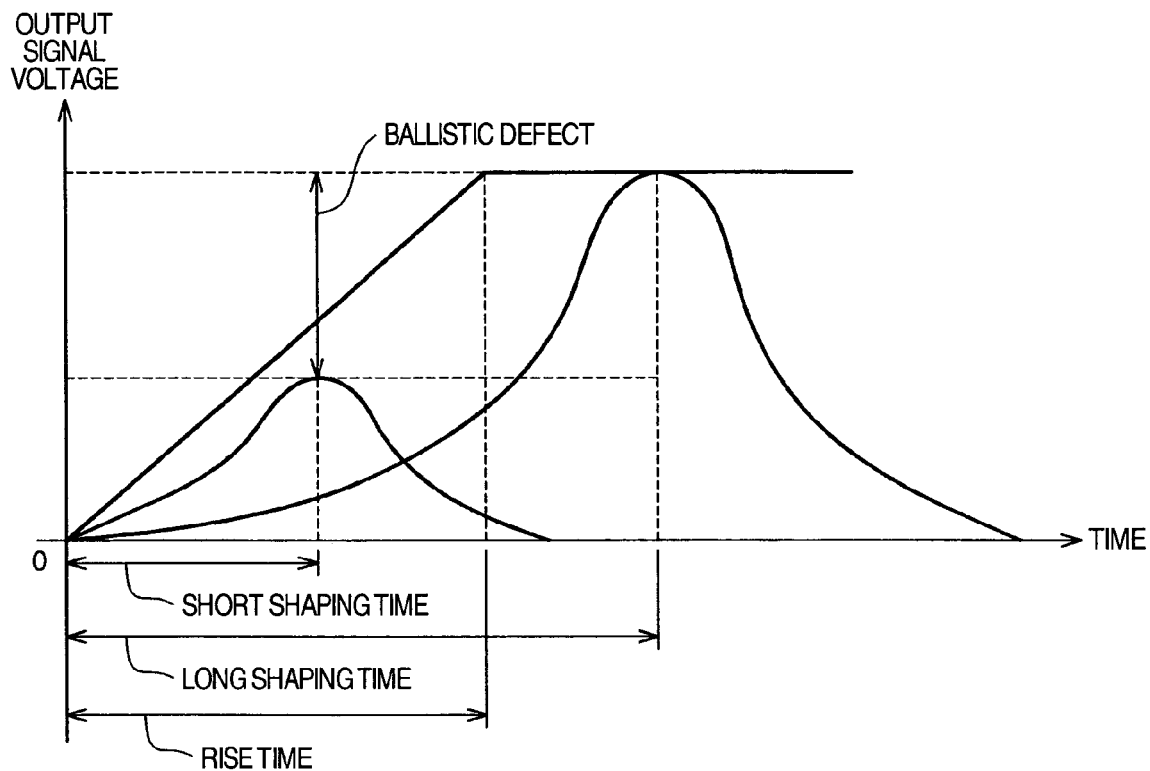

FIG. 6A shows a variation in the maximum value (referred to as a pulse height value below) of the output signal voltage from the shaping amplifier 12 with respect to a varying shaping time. If the shaping time is sufficiently long compared to the rise time ($\approx$ charge collection time) of the output signal voltage from the charge amplifier 11, the pulse height value of the shaping amplifier 12 is almost proportional to the pulse height value of the charge amplifier 11, that is, the energy of an incident γ ray (referred to as incident energy).

However, as the shaping time decreases below the rise time, the current pulse height value of the output signal voltage from the shaping amplifier 12 decreases below the pulse height value proportional to the incident energy. A defect in a signal which occurs when the signal cannot completely be transmitted owing to a decrease in shaping time is called a ballistic defect.

Figure 6B:
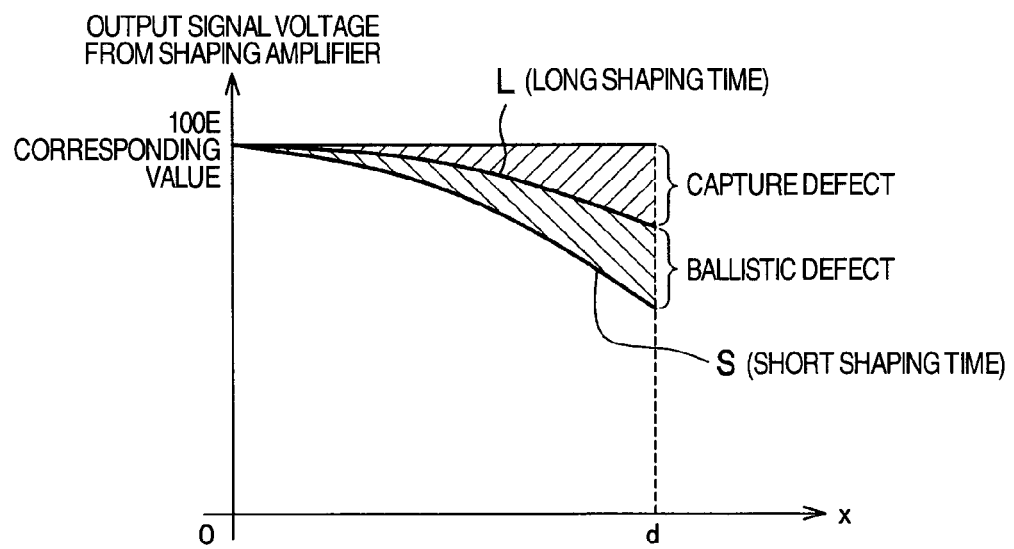

FIG. 6B shows the relationship between the incident position of the each γ ray 6 and the output signal voltage from the shaping amplifier 12 for a longer shaping time (L) and for a shorter shaping time (S). In this graph, the axis of abscissa indicates the distance (x shown in FIG. 2) from the electrode 24 as the incident position of the γ ray 6. The axis of ordinate indicates the pulse height value of the output signal value from the shaping amplifier 12. Further, 100E is assumed to indicate the output signal voltage from the shaping amplifier 12 obtained if no loss occurs.

For x$\approx$0 (at a position immediately close to the electrode 24), the magnitudes of both capture and ballistic defects are very small, so that the signal voltage is almost 100E.

A conventional measuring method sets the shaping times of the two shaping amplifiers 12, shown in FIG. 4, at large values enough to neglect the ballistic defect. In this case, as shown by characteristic L (FIG. 6B), the magnitude of the capture defect increases as the incident position of the γ ray 6 nears x$\approx$d (position immediately close to the electrode 23). This is a cause of degradation of the energy resolution.

In contrast, with the configuration shown in FIG. 4, for example, the shaping time of the shaping amplifier 12 connected to the electrode 23 is set at a large value enough to neglect the ballistic defect. The shaping time of the shaping amplifier 12 connected to the electrode 24 is set at a small value enough to result in a marked ballistic defect.

The output signal voltage corresponds to the capture defect to which the ballistic defect is added. As the incident position of the γ ray 6 nears x≈d, the output signal voltage decreases by a value corresponding to the combination of the capture and ballistic defects as shown by characteristic S (FIG. 6B). The capture defect can be corrected by thus using the output signal voltage obtained with the short shaping time intentionally causing the ballistic defect. A specific example of a method for distinguishing two signals apparently having the same energy, on the basis of the above correction is shown.

Figure 7:
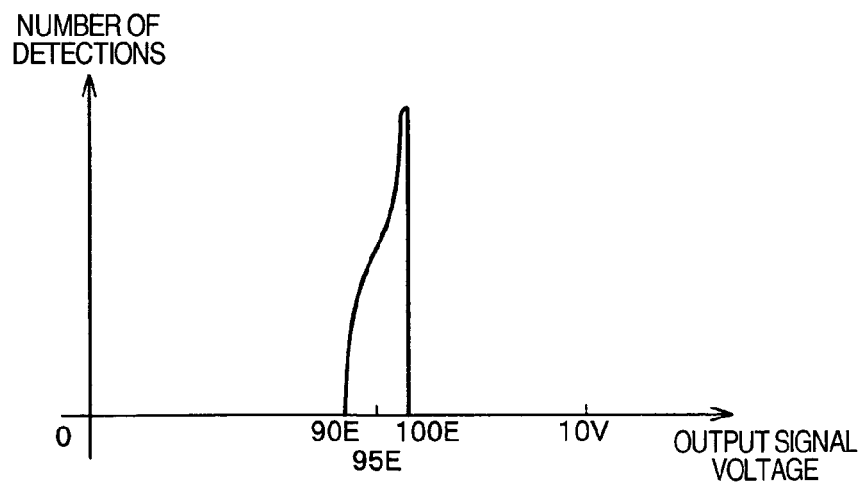
FIG. 7 is a histogram (energy spectrum) showing the relationship between the output signal voltage from the shaping amplifier and the number of times the output signal voltage has been detected.

FIG. 7 shows an energy spectrum having the distribution of the capture defect. The axis of abscissa indicates the output signal voltage from the shaping amplifier. The axis of ordinate indicates the frequency of the output signal voltage. The value of the output signal voltage on the axis of abscissa is obtained by, for example, an ADC (Analog-to-Digital Converter) by converting analog values of 0 to 10 V into digital values at 4,096 levels. Ideally, the value of the output signal voltage is in proportion to the incident energy of the γ ray 6. The number of detections on the axis of ordinate indicates the number of times the output signal voltage within the range of analog values corresponding to each digital level has been detected.

Here, when, for example, an output signal voltage of 95E is detected, two cases are expected. In a first case, energy of 100E is input but a capture defect of 5E occurs, so that 100−5=95E. In a second case, energy of 95E is input and almost no capture defect occurs. However, it is impossible to determine this to be the first or second case using the output signal voltage from only one shaping amplifier 12.

Thus, the magnitude of the capture defect is estimated by using the two shaping amplifiers 12 with different shaping times to execute the respective waveform shaping processes and comparing the two signal voltages obtained by the respective processes. The two shaping times are set as described below. One of the shaping amplifier 12 is set to have a long shaping time (first shaping time) that is several times (specifically about four times) as long as the collection time (rise time) required when the hole 8 migrates from the electrode 23 to the electrode 24. This is to reduce the magnitude of the ballistic defect to a negligible value. The other shaping amplifier 12 is set to have a short shaping time (second shaping time) that is equal to or shorter than the collection time (specifically at least three-tenths of the collection time and equal to or shorter than the collection time). This is to generate several tens of percents of the ballistic defect. The second shaping time is shorter than the first shaping time. The set values of the shaping times can be determined by the type of the semiconductor base material 4, the distance between the electrodes not electrically connected together, and the voltage value of the high-voltage power source 5.

Figure 8A:
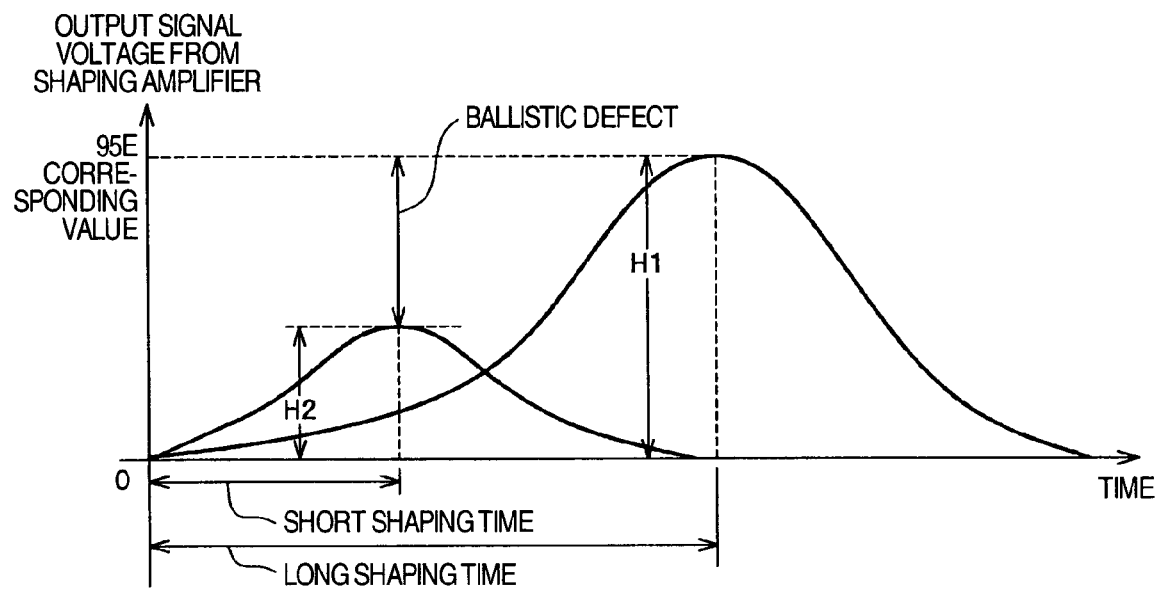

As shown in FIG. 8A, the output signal voltages from the two shaping amplifiers 12 with the different shaping times have pulse height values H1 and H2, that is, there is a difference in pulse height value between the output signal voltages. The difference in pulse height value results from the ballistic defect. The magnitude of the ballistic defect can be calculated on the basis of the characteristics of the shaping amplifier 12. The rise time of the γ ray detection signal (induced charge signal) can be estimated on the basis of the calculated magnitude of the ballistic defect and the two shaping times. The determination of the rise time makes it possible to estimate the contribution of the electron and hole to the γ ray detection signal (induced charge signal) (see FIG. 3). This enables the magnitude of the ballistic defect to be calculated. FIG. 8A in the above example can be estimated to correspond to the first case, in which the ballistic defect and thus the capture defect are significant.

Figure 8B:
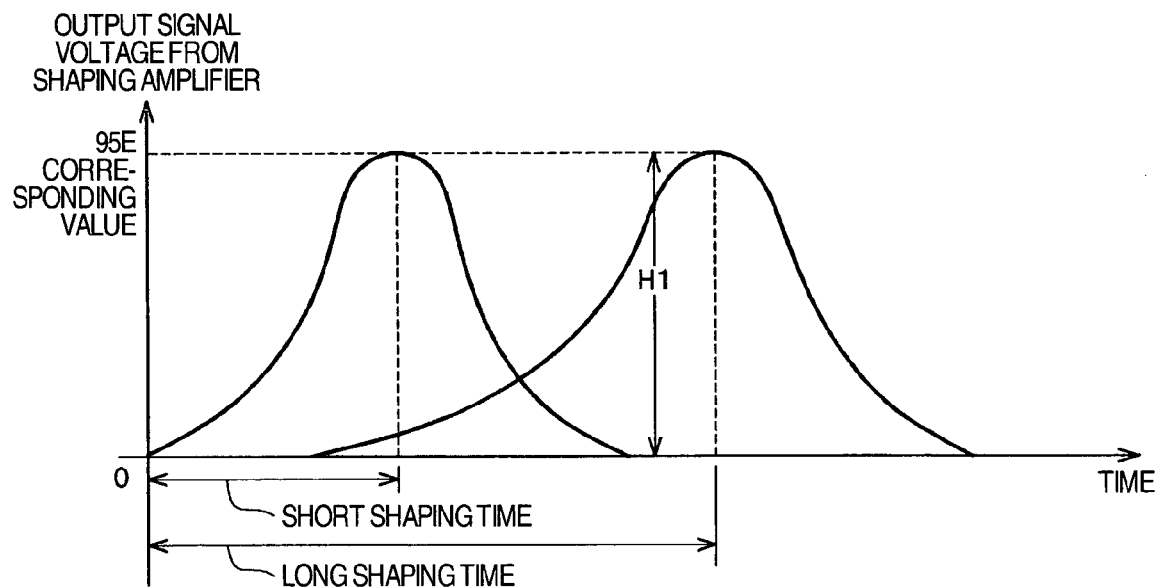

On the other hand, in FIG. 8B, both output signal voltages resulting from the two shaping times have the pulse height value Hl, that is, there is no difference in pulse height value between the output signal voltages. In other words, no ballistic defect is occurring. Thus, in this signal output, the signals are fast and the electrons 7 have a very high contribution. Consequently, only a very insignificant capture defect occurs. FIG. 8B can thus be estimated to correspond to the second case with no capture defect.

Figure 12:
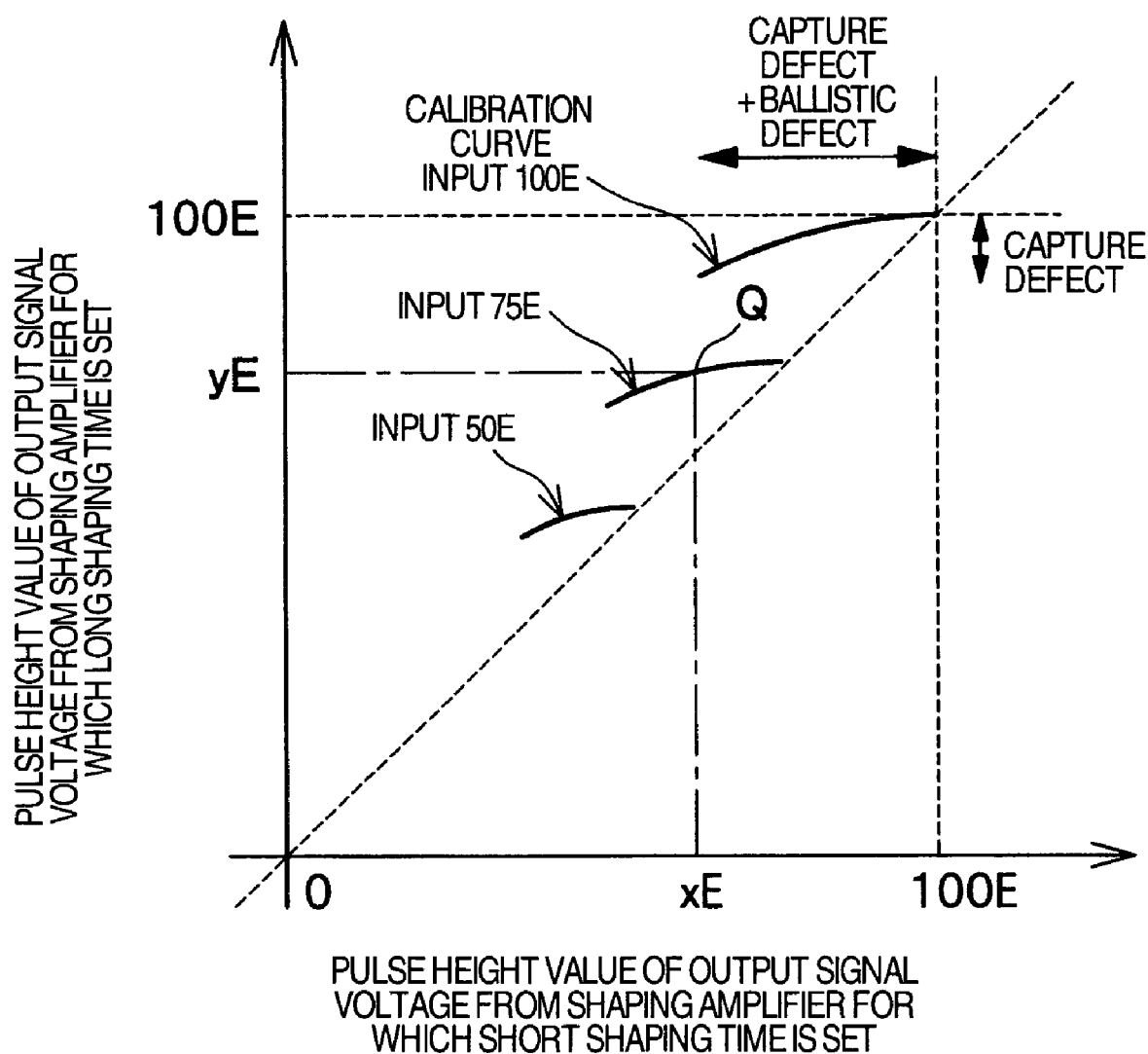
FIG. 12 is a characteristic diagram showing calibration curves on the basis of the pulse height of an output signal voltage from a shaping amplifier with a short shaping time and the pulse height of an output signal voltage from a shaping amplifier with a long shaping time.

Actually, an output ratio curve is calculated on the basis of the characteristics of the shaping amplifiers 12 having the different shaping times as shown in FIG. 12. An input energy value is then obtained using a group of approximate curves (100E, 75E, and 50E are representatively shown but the curves extend continuously through other areas). The correction can be made simply by using hardware to execute only a process corresponding to, for example, rotation.

For simplification, a plurality of defects are represented as a sum. Actually, a composite defect is expressed by 1−(1−capture defect)×(1−ballistic defect). When the magnitudes of the capture and ballistic defects are small, the composite defect obtained by this expression is almost equal to the sum of the capture and ballistic defects.

Thus utilizing the output resulting from the short shaping time enables the magnitude of the capture defect, which has an unknown value, to be calculated for correction. However, a problem with this method is that when the shaping time is reduced for correction, the magnitude of noise from the shaping amplifiers 12 increases sharply under the effect of the parasitic capacity. Description will be given below of an embodiment of a radiological imaging apparatus to which the correction of the pulse height value which can suppress the adverse effect of the parasitic capacity is applied.

<<Application to Radiological Imaging Apparatus>>

Figure 9:
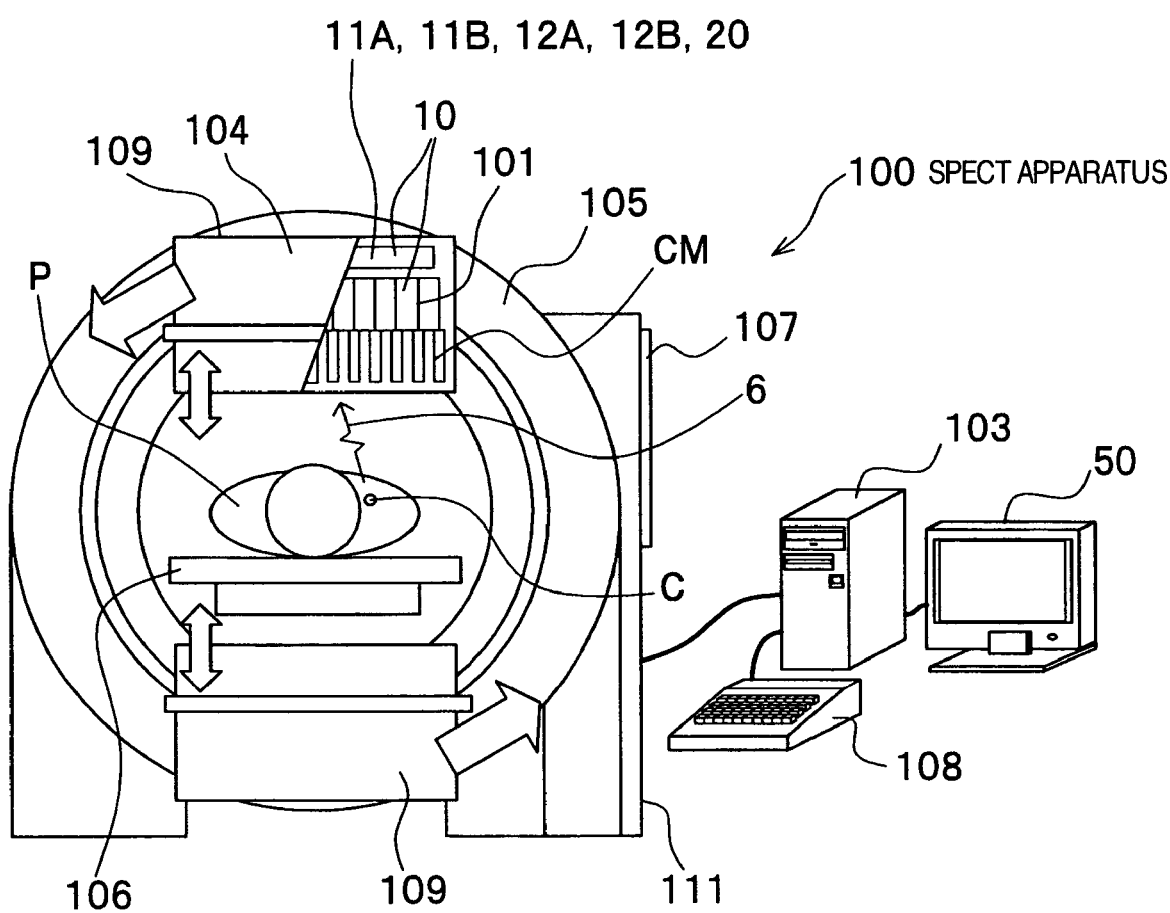
FIG. 9 is a diagram showing the configuration of a SPECT apparatus that is a preferred embodiment of a radiological imaging apparatus according to the embodiment of the present invention.

FIG. 9 shows a SPECT (Single Photon Emission Computed Tomography) apparatus, an example of a nuclear medicine diagnosis apparatus that is a kind of radiological imaging apparatus according to a preferred embodiment of the present invention. The SPECT apparatus will be described below with reference to FIGS. 9, 10, and 11. Here, the radiological imaging apparatus introduces a radioactive agent labeled with RIs (Radio Isotopes) into a subject such as patient and detects a γ ray emitted by the RIs to acquire the distribution of RIs in the subject. The SPECT apparatus 100 comprises a rotating support table 105 pivotably installed on a support member 11, a pair of camera head sections 109 installed opposite the rotating support table 105, a bed 106 that can move in a longitudinal direction, a plurality of semiconductor detecting devices 10, a plurality of signal processing devices 20, a data collecting and analyzing device 103, and a display device 50. The camera head sections 109 project from the rotating support table 105 in the longitudinal direction of the bed 106. The bed 106, on which the subject P lies, is inserted between the two opposite camera head sections 109. Each of the camera head sections 109 has a support member (not shown) installed on the rotating support table 105 and which is movable in a radial direction of the rotating support table 105, a plurality of sets of semiconductor detecting devices 10, a plurality of signal processing devices 20, and a collimator CM. The plurality of sets of semiconductor detecting devices 10, the plurality of signal processing devices 20, and the collimator CM are installed on the respective support members. The collimator CM has a large number of through-holes (radiation passages) and is placed so as to face the bed 106. Semiconductor detectors 1 are provided in a radiation detecting section 101 included in each of the semiconductor detecting devices 10 (see FIG. 10). The semiconductor detectors 1 are arranged behind the collimator CM so that radiation (γ ray) having passed through the through-holes in the collimator CM is incident on each semiconductor detector 1.

Each camera head section 109 has a light blocking electromagnetic shield 104. The collimator CM, semiconductor detecting devices 10, and signal processing devices 20 are housed in the light blocking electromagnetic shield 104. The light blocking electromagnetic shield 104 blocks the electromagnetic waves except the radiation as well as radiation from all the directions except from the collimator. Accordingly, these electromagnetic waves and radiation are not detected by the semiconductor detectors 1 and not input to the signal processing devices 20 or charge or shaping amplifiers, described below, as noise. The light blocking electromagnetic shield 104 can be opened and closed when the collimator CM is replaced or removed.

Each of the semiconductor detecting devices 10 has a radiation detecting section 101, four charge amplifiers 11A and 11B, and four shaping amplifiers 12A and 12B. The radiation detecting section 101 includes 16 semiconductor detectors 1 arranged in four rows and four columns.

Figure 10:
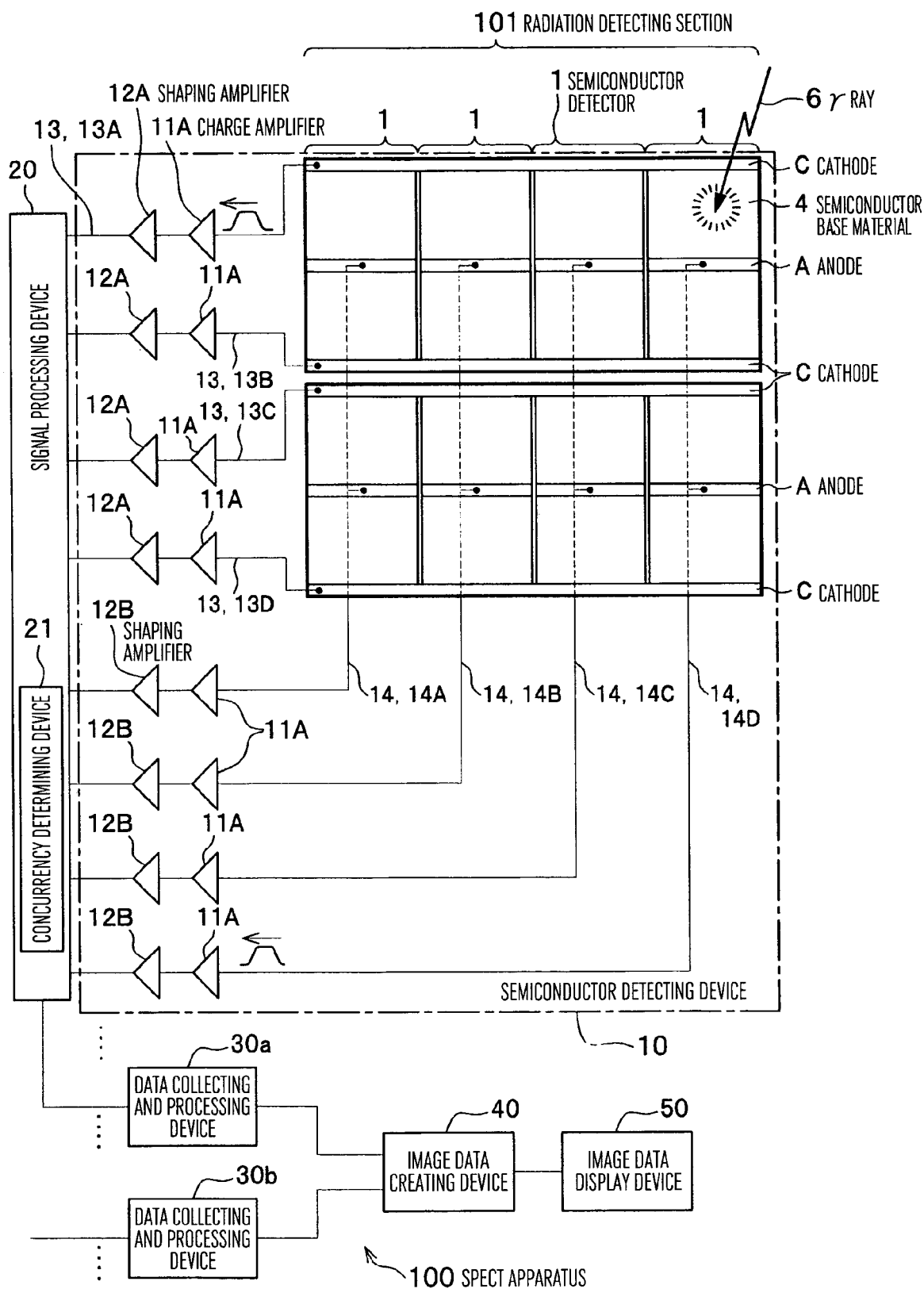
FIG. 10 is a detailed diagram of the configuration of a radiation detecting device used in the SPECT apparatus shown in FIG. 9.
Figure 11:
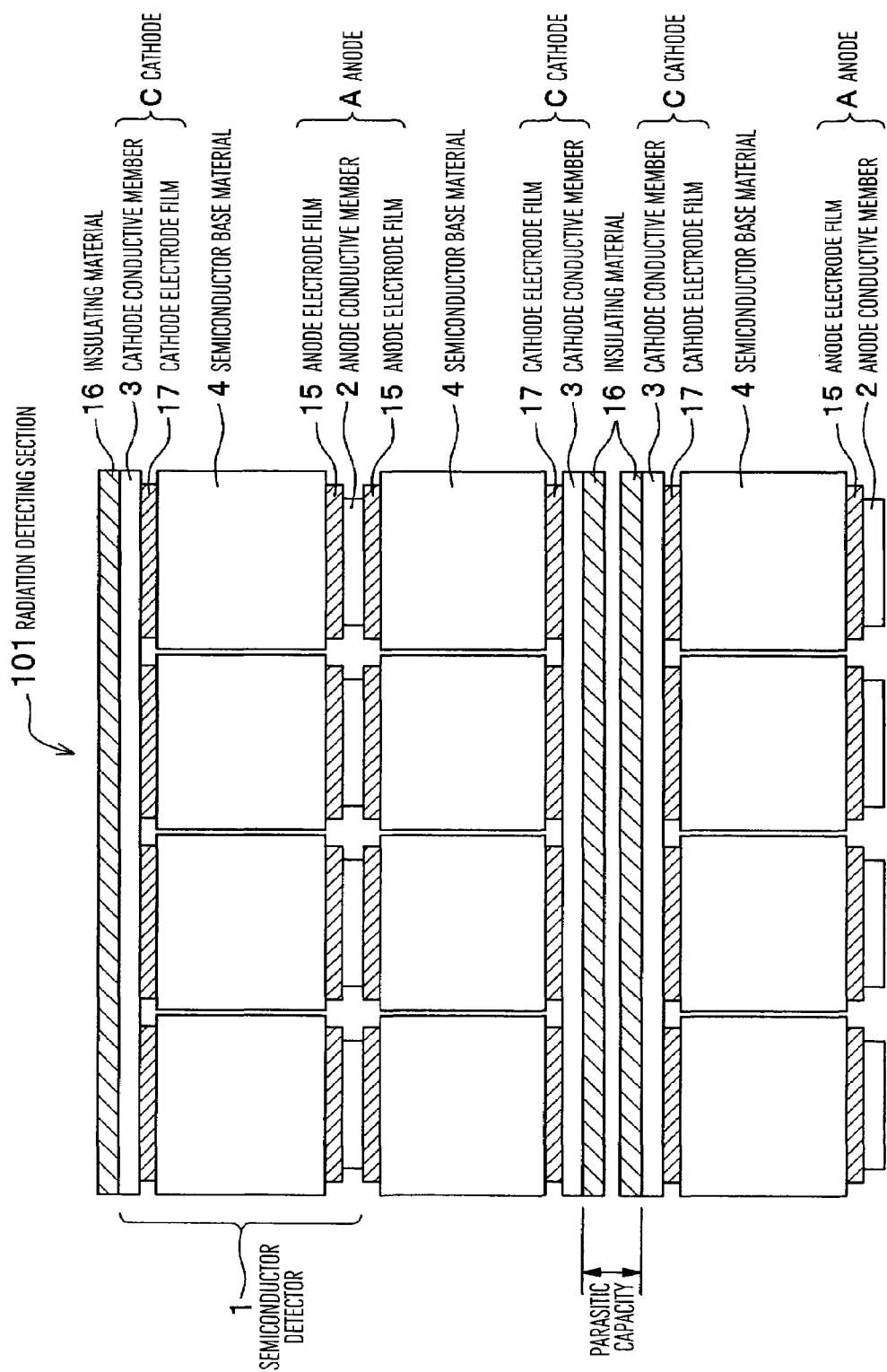
FIG. 11 is a detailed diagram of the configuration of a radiation detecting section of the radiation detecting device shown in FIG. 10.

The configuration of the radiation detecting section 101 will be described in detail with reference to FIG. 11. The semiconductor detector 1 has a semiconductor base material 4, an anode conductive member 2, an anode electrode film 15, and a cathode electrode film 17. The electrode film (anode electrode) 15 and electrode film (cathode electrode) 17 are formed on the semiconductor base material (semiconductor member) 4 so as to lie opposite each other across the semiconductor base material 4. The electrode films 15 and 17 are formed by depositing conductive metal (for example, indium) on a surface of the semiconductor base material 4. Sixteen semiconductor detectors 1 thus configured are arranged in four rows and four columns so as to form a square lattice. That is, as shown in FIG. 10, a plurality of semiconductor detectors 1 are present in a lateral direction, while a plurality of semiconductor detectors 1 are present in a vertical direction. In each column of semiconductor detectors 1, the adjacent semiconductor detectors 1 are arranged so that the electrode films 15 are opposite each other. Each of the two electrode films 15 located opposite each other using a conductive adhesive is attached to one of the conductive members 2 of the anode using a conductive adhesive. A cathode conductive member 3 is attached to the electrode films 17 of the four semiconductor detector 1 in the row using a conductive adhesive. In the radiation detecting section 101, the conductive member 2 is provided for every two semiconductor detectors 1. The conductive member 3 is shared by the four semiconductor detectors 1 in the row. Paired conductive members 3 located in the center of the radiation detection section 101 lie opposite each other with a very small spacing (for example, 200 μm) between them. The conductive members 2 and 3 are composed of conductive metal (for example, copper). An insulating material 16 covers each conductive member 3. This insulates the adjacent conductive members 3 from each other. A plus side of a high-voltage power source 5 shown in FIG. 1 is connected to each of the conductive members 2. A minus side of the high-voltage power source 5 is connected to each of the conductive members 3. The high-voltage power source 5 applies a voltage of 200 V to between the electrode films 15 and 17 of the semiconductor detector 1. Either the conductive member 2 or 3 may be grounded. When the charge amplifier 11 is connected to the ungrounded (high voltage) conductive member, a capacitor with a high withstanding voltage is used to achieve AC coupling. A sufficiently large resistance is placed between the conductive member 2 and the high-voltage power source 5; the resistance is sufficiently larger than a resistance component of capacitive coupling.

Each of the semiconductor detectors 1 included in the radiation detecting section 101 is attached to a support substrate (not shown) on one surface of the semiconductor detector 1 (back surface in a direction orthogonal to the sheet of FIG. 10). The electrodes 15 and 17 are attached to the support substrate so as to stand perpendicularly to the support substrate. The support substrate is installed on the support member of the camera head section 109. Wires 13A, 13B, 13C, and 13D provided on the support substrate are separately connected to the respective conductive members 3, provided along the arrangement of the semiconductor detects 1 in each row. Wires 14A, 14B, 14C, and 14D provided on the support substrate are connected to the corresponding conductive members 2, provided in the respective four semiconductor detectors 1 in each column.

The signal processing device 20 includes an analog/digital converter (ADC; not shown) and a concurrency determining device 21. The wires 13A, 13B, 13C, and 13D are connected to the ADC of the signal processing device 20 via the charge amplifier 11A and shaping amplifier 12A. The wires 14A, 14B, 14C, and 14D are connected to the ADC of the signal processing device 20 via the charge amplifier 11B and shaping amplifier 12B. The ADC is connected to the concurrency determining device 21. The conductive member 3 connects a plurality of semiconductor detectors 1 arranged in one direction (specifically, four semiconductor detectors 1 in the row). The wire 14A connects a plurality of semiconductor detectors 1 (specifically, four semiconductor detectors 1 in the column) arranged in a direction crossing the above direction (specifically orthogonal direction). Each of the wires 14B, 14C, and 14D also connects four semiconductor detectors 1 in other columns crossing the above direction.

In the arrangement of the semiconductor detectors 1 in each row, the adjacent electrode films 15 are insulated from each other, and the conductive members 2 are insulated from each other. In the present embodiment, the cathode conductive member 3 is grounded. However, the anode conductive member 2 may be grounded.

The wires 13A, 13B, 13C, and 13D and the wires 14A, 14B, 14C, and 14D are connected to the concurrency determining device 21 in one signal processing device 20; the wires 13A, 13B, 13C, and 13D and the wires 14A, 14B, 14C, and 14D are used for each of the radiation detecting sections 101 for several hundred semiconductor detecting devices 10. The concurrency determining device 21 in the signal processing device 20 is connected to a data collecting processing device 30a. Several hundred signal processing devices 20 are connected to the data processing device 30a; several hundred semiconductor detecting devices 10 are connected to the signal processing device 20. Several hundred signal processing devices 20 are also connected to another data processing device 30b; several hundred semiconductor detecting devices 10 are connected to the signal processing device 20. A plurality of data collecting and processing devices such as the data collecting and processing devices 30a and 30b are connected to an image data creating device 40. The display device 50 is connected to the image data creating device 40. The data collecting and analyzing device 103 includes a plurality of data collecting and processing devices such as the data collecting and processing devices 30a and 30b and the image data creating device 40. The charge amplifiers 11A and 11B are preamplifying devices. The shaping amplifiers 12A and 12B that are waveform shaping and amplifying devices are waveform shaping devices.

The large number of radiation detecting section 101, provided in the camera head section 109, are arranged in a matrix. The radiation detecting sections 101 adjacent to each other across the columns are arranged so that the electrode films 17, specifically, the conductive members 3 lie opposite each other. The conductive members 3 are not electrically connected together.

The charge amplifiers 11A and 11B and shaping amplifiers 12A and 12B have a function for converting a γ ray detection signal (induced charge signal) output by the semiconductor detector 1 into a voltage signal and then amplifying and shaping the voltage signal as described above. The shaping amplifier 12A connected to the conductive member 3 has a shaping time different from that of the shaping amplifier 12B connected to the conductive member 2. That is, as shown in FIG. 6A, the shaping time of the shaping amplifier 12A is set longer than the rise time (≈charge collection time) of a γ ray detection signal (induced charge signal) output by the semiconductor detector 1. This set value corresponds to the above first shaping time. Further, the shaping time of the shaping amplifier 12B is set shorter than its rise time. This set value corresponds to the above second shaping time. Thus, the shaping amplifier 12B has a shorter shaping time than the shaping amplifier 12A.

Description will be given below of why the shaping amplifier 12B has a shorter shaping time than the shaping amplifier 12A.

The semiconductor detectors 1 in the radiation detecting section 101 must be densely arranged in order to improve a γ ray detection sensitivity. To achieve this, the spacing between the conductive members 3 adjacent to each other within the column must be small, for example, several tens to 300 μm. These conductive members 3 are not electrically connected together but are arranged so as to face each other. Thus, the spacing between the conductive members 3 is not sufficient. Consequently, a large parasitic capacity may be generated between the conductive members 3. The parasitic capacity generated between the conductive members 3 is, for example, about 5 to 20 [pF]. The parasitic capacity may degrade the characteristics of the waveform shaping process executed by the shaping amplifier 12A, connected to the conductive member 3. The degradation of the characteristics is notably marked in a waveform shaping process with a short shaping time. Accordingly, this is particularly disadvantageous when the capture defect is corrected using the shaping amplifiers 12A and 12B having the same shaping time. Generation of a parasitic capacity between the conductive members 3 means that a parasitic capacity is also generated between two opposite electrode films 17 to which these conductive members 3 are attached.

The two electrode films 15 opposite to each other within the column are connected together in a DC manner. Accordingly, no parasitic capacity is generated between these electrode films 15. The conductive members 2 adjacent to each other in the row are opposite each other at the ends of the electrode films 15 but not at their surfaces opposite to the semiconductor base materials 4. Consequently, only a very small parasitic capacity is generated between these conductive members 2.

The inventors examined various methods of making it possible to suppress the adverse effect of a large parasitic capacity that may be generated between the conductive members 3. As a result, the inventors have found that by setting the shaping time of the shaping amplifier 12B connected to the conductive member 2 shorter than that set for the shaping amplifier 12A, it is possible to suppress the adverse effect of a parasitic capacity that may be generated between the conductive members 3 to improve the energy resolution of the radiological imaging apparatus. On the basis of this new knowledge, the shaping amplifier 12B connected to the conductive member 2 executes a waveform shaping process with a shaping time shorter than that set for the shaping amplifier 12A.

Description will be given of checks on the subject P using the SPECT apparatus 100. The bed 106 on which the subject P administered with a radioactive agent is moved in the longitudinal direction. The bed 106 is moved by operating the operation panel 107 in a room where the SPECT apparatus 100 is installed. The subject P is positioned between the opposite camera head sections 109. Further, the operation panel 107 is used to move the camera head sections 109 in the radial direction of the rotating support table 105 to adjust the distance between the camera head sections 109 and the subject P. Movement of the bed 106 and radial movement of the camera head sections 109 can be remotely achieved using a data I/O device 108. During checks, the rotating support table 105 is rotated by the driving force of a motor (not shown). Thus, the pair of camera head sections 109 pivot around the subject P lying on the bed 106. The radioactive agent administered to the subject P is collected in an accumulated portion (for example, a cancerous site) C to emit a γ ray 6.

The γ ray 6 is incident on a certain semiconductor detector 1 provided in the pivoting camera head section 109, through the corresponding through-hole in the collimator CM. The γ ray 6 is incident on the semiconductor base material 4 through a front surface of the semiconductor detector 1 in a direction orthogonal to the sheet of FIG. 10. A voltage of 300 V is applied to between the electrode films 15 and 17. An electron generated by the interaction between the γ ray 6 and the semiconductor base material 4 migrates to the electrode film 15. A hole migrates to the electrode film 17. A γ ray detection signal (induced charge signal) output by the electrode film 15 passes through the conductive member 2. The γ ray detection signal is then sequentially input to the charge amplifier 11B, the shaping amplifier 12B, and the concurrency determining device 21 of the signal processing device 20 through the corresponding wire 14. A γ ray detection signal (induced charge signal) output by the electrode film 17 passes through the conductive member 3. The γ ray detection signal is then sequentially input to the charge amplifier 11A, the shaping amplifier 12A, and the concurrency determining device 21 of the signal processing device 20 through the corresponding wire 13.

The charge amplifier 11A outputs an output signal voltage obtained by amplifying a γ ray detection signal (induced charge signal) output by the conductive member 2. The output signal voltage from the charge amplifier 11A is input to the shaping amplifier 12A. The shaping amplifier 12A then executes a predetermined waveform shaping process and then outputs an output signal voltage obtained. The ADC in the signal processing device 20 converts this output signal voltage into a digital signal and then inputs the signal to the concurrency determining device 21. The pulse height value of the digital signal is shown at H2 in FIG. 8A (or at H1 in FIG. 8B). The charge amplifier 11B amplifies the γ ray detection signal (induced charge signal) output by the conductive member 3 and then outputs an output signal voltage obtained. The output signal voltage from the charge amplifier 11B is input to the shaping amplifier 12B for which a shaping time shorter than that of the shaping amplifier 12A is set. The shaping amplifier 12B executes a predetermined waveform shaping process and then outputs an output signal voltage obtained. The ADC in the signal processing device 20 also converts this output signal voltage into a digital signal and then inputs the signal to the concurrency determining device 21. The pulse height value of the digital signal is shown at H1 in FIG. 8A (or FIG. 8B).

The output signal voltages from the shaping amplifiers 12A and 12B are input to the concurrency determining device 21 of the signal processing device 20; the shaping amplifiers 12A and 12B are connected to the semiconductor detectors 1 in the several hundred semiconductor detecting sections 101. The concurrency determining device 21 determines the position of the semiconductor detector 1 having detected the γ ray for each set (radiation detecting section 101). For example, when of the 16 semiconductor detectors 1, the semiconductor detector 1 located in the first row from the top of FIG. 10 and in the first column from the right end of FIG. 10 detects a γ ray 6, an output signal voltage is output to each of the wires 14D and 13A. The concurrency determining device 21 determines whether or not the two output signal voltages have arrived within a set time (for example, 1 μs). If the concurrency determining device 21 determines that the "two output signal voltages have arrived within the set time", the output signal voltages have been generated on the basis of γ ray detection signals (induced charge signals) simultaneously generated by the incidence of the one γ ray 6. The concurrency determining device 21 then determines that the γ ray 6 has been detected by the semiconductor detector 1 located in the first row from the top of the radiation detecting section 101 and in the first column from the right end of the radiation detecting section 101. The concurrency determining device 21 transmits, to the data collecting and processing device 30a, position data (position information) on the semiconductor detector 1 determined in the concurrency determination to have detected the γ ray 6, the pulse height value (digital value obtained by the conversion by the ADC) of the output signal voltage from the shaping amplifier 12A to which the γ ray detection signal (induced charge signal) from the electrode film 17 of this semiconductor detector 1 is input through the wire 13A, and the pulse height value (digital value obtained by the conversion by the ADC) of the output signal voltage from the shaping amplifier 12B to which the γ ray detection signal (induced charge signal) from the electrode film 15 of this semiconductor detector 1 is input through the wire 14D. This position data is called first position data. The concurrency determining device 21 may be externally connected to the signal processing device 20.

The data collecting and processing device 30a accumulates the input first position data on the semiconductor detector 1 having detected the γ ray, the input pulse height value of the output signal voltage from the shaping amplifier 12A, and the input pulse height value of the output signal voltage from the shaping amplifier 12B. The data collecting and processing device 30a is connected to the signal processing device 20 to collect data from the signal processing device 20. The data collecting and processing device 30a transmits the accumulated position data, the accumulated pulse height values of the output signal voltages from the shaping amplifier 12A, and the accumulated pulse height values of the output signal voltages from the shaping amplifier 12B, to the image data creating device 40. The data collecting and processing device 30b executes a process similar to that executed by the data collecting and processing device 30a.

The data collecting and processing devices 30a and 30b input the first position data, the pulse height values of the output signal voltages from the shaping amplifier 12A, and the pulse height values of the output signal voltages from the shaping amplifier 12B, to the image data creating device 40. On the basis of these data, the image creating device 40 creates tomography data on the RI distribution of the subject P. That is, the image data creating device 40 determines the positions of the pivoting camera head sections 109 upon the detection of the γ ray, on the basis of the time data. Position data indicative of the positions of the camera head sections 109 is called second position data. It is possible to accurately calculate the position (γ ray detection position) of the semiconductor detector 1 around the subject P upon the detection of the γ ray, on the basis of the first and second position data. The image data creating device 40 calculates the γ ray detection position. Identification of the γ ray detection position enables the incident direction of the γ ray to be accurately determined in connection with the throughhole in the collimator CM through which the γ ray has passed. The image data creating device 40 creates tomography data (image data on RI distribution) on the subject P on the basis of data on the γ ray detection positions of a large number of semiconductor detectors 1 having detected the γ ray detection signal (induced charge signal) and on the incident directions of γ rays at these positions. The tomography data is displayed on the display device 50.

The image data creating device 40 stores the information shown in FIG. 12, in a memory (not shown). The information shown in FIG. 12 is pulse height value calibration curves based on the pulse height value of the output signal voltage from the shaping amplifier 12B for which the short shaping time is set and the pulse height value of the output signal voltage from the shaping amplifier 12A for which the long shaping time is set. For example, it is assumed that the pulse height value yE of the output signal voltage from the shaping amplifier 12A and the pulse height value xE of the output signal voltage from the shaping amplifier 12B are input to the image data creating device 40. In FIG. 12, the intersection point Q between the pulse height values xE and yE is located on the calibration curve for the input 75E. The input 75E corresponds to the pulse height value of the γ ray incident on the semiconductor detector 12, that is, the energy of the γ ray. In this manner, the energy of the γ ray incident on the semiconductor detector 12 can be accurately determined by correcting the pulse height value of the output signal voltage from the shaping amplifier 12A using the pulse height value of the output signal voltage from the shaping amplifier 12B. This improves the energy resolution of the SPECT imaging apparatus 100. Alternatively, the signal processing device 20 can use such a simplified process as described above (for example, a process corresponding to rotation) correct the pulse height value of the output signal voltage from the shaping amplifier 12A on the basis of the pulse height value of the output signal voltage from the shaping amplifier 12A and the pulse height value of the output signal voltage from the shaping amplifier 12B. This also makes it possible to determine the energy resolution of the γ ray incident on the semiconductor detector 12.

The image data creating device 40 excludes data on the detection of a γ ray scattered within the subject P on the basis of the corrected pulse height value of the γ ray incident on the semiconductor detector 12. The image data creating device 40 thus creates tomography data as described above on the basis of the γ ray detection position of the semiconductor detector 12 having output a γ ray detection signal (induced charge signal) having a pulse height value equal to or larger than a set value. The set pulse height value (energy window) expressed as direct linear data is set in association with the radioactive isotope contained in the radioactive agent used. The γ ray scattered within the subject P has a low energy when entering the semiconductor detector 1. The pulse height value of a detection signal for this γ ray is smaller than the set value. The SPECT imaging apparatus 100 can execute the above correction to improve the energy resolution of the incident γ ray.

Thus, the present embodiment achieves a high energy resolution to enable scattered radiation to be precisely excluded. Accordingly, the information on the energy of the γ ray can be used to determine whether the output signal is based on a γ ray emitted from the position in the subject P where the radioactive agent is accumulated and then entering the semiconductor detector 1 without bending or on a γ ray bent within the body of the subject P. Consequently, tomography data can be obtained which has only a small spread from the distribution of the radioactive agent, that is, the radioactive isotope, within the body of the subject P.

In the present embodiment, the shaping amplifier 12B (called a second shaping amplifier) connected to the conductive member 2 attached to the electrode films 15 executes a waveform shaping process with a shaping time shorter than that of the shaping amplifier 12A (called a first shaping amplifier) connected to the electrode films 17, which lie opposite each other without being electrically connected; the electrode films 15 are electrically connected together, so that no parasitic capacity is generated between them. Thus, by correcting the pulse height value of the first output signal on the basis of the pulse height value of the output signal voltage (first output signal) from the first shaping amplifier and the pulse height value of the output signal voltage (second output signal) from the second shaping amplifier, it is possible to more precisely correct the pulse height value of the first output signal to improve the energy resolution. The present embodiment can thus suppress the adverse effect of a parasitic capacity generated between the electrode films 17, lying opposite each other without being electrically connected. This enables the semiconductor detector 1 to be more densely arranged in the camera head section 109. The more dense arrangement of the semiconductor detector 1 improves the sensitivity with which the γ ray emitted by the subject P is detected, thus reducing the time required for the detection. The more dense arrangement of the semiconductor detector 1 also improves space resolution.

The time required to collect charges is reduced by increasing the voltage applied to between the electrode films 15 and 17 of the semiconductor detector 1 or reducing the distance between the electrode films: the charges are generated in the semiconductor base material 4 as a result of the incidence of a γ ray on the semiconductor base material 4. The applied voltage is desirably reduced in view of leak current noise and substrate insulation lifetime. According to the present embodiment, the shaping time set for the second shaping amplifier is shorter than that set for the first shaping amplifier. This enables the applied voltage (bias voltage) to 200 V.

A reduction in applied voltage increases the magnitude of the capture defect. This reduces the energy resolution if measurements are made using a single common shaping amplifier. However, the present embodiment enables the two shaping amplifiers (first and second shaping amplifiers) to make corrections in spite of a dense arrangement. This makes it possible to obtain a high energy resolution using an applied voltage lower than that used for measurements with a single shaping amplifier. The applied voltage is, for example, 600 V, in the prior art and is 150 V according to the present embodiment. This difference serves to appropriately avoid restrictions such as mounting line-to-line distance. Thus, the present embodiment can reduce the applied voltage to improve the energy resolution. A reduction in applied voltage relaxes the insulation of the radiation detecting section 101.

According to the present embodiment, the electrode films 17 of the four semiconductor detector 1 arranged within the row are electrically connected together (by the conductive member 3). Further, the electrode films 15 of the four semiconductor detector 1 arranged within the column are electrically connected together. Accordingly, eight signal read channels are required for 4×4=16 pixels arranged in a matrix. Thus, the number of signal read channels is reduced. The 4×4 pixels are used for convenience, but the present invention is not limited to this. That is, 2N channels are required for N×N pixels. The number of signal read channels is sharply reduced by increasing N within the allowable ranges of counting rate and detector electrostatic capacity. This makes it possible to significantly reduce the number of signal pickup wires provided on the support substrate. The SPECT apparatus 100, which can produce the above effects, suppresses the adverse effect of the parasitic capacity to allow the semiconductor detectors 1 to be more densely arranged. In this case, the significantly small number of signal read channels allows the wires to be easily installed on the support substrate without congestion.

According to the present embodiment, the electrode films 15 and 17 of the semiconductor detector 1 are arranged perpendicularly to the support substrate. This enables the semiconductor detectors 1 to be arranged more densely than the horizontal arrangement of the electrode films 15 and 17 with respect to the support substrate. This is because the perpendicular arrangement makes it possible to reduce the spacing between the adjacent semiconductor detectors 1 which spacing is required to arrange conductive members such as wires connecting the respective electrode films to the wires provided on the support substrate.

The conductive member 2, composed of a conductive metal plate, is used to connect the electrode films 15 of the two semiconductor detectors 1. Further, the conductive member 3, composed of a conductive metal plate, is used to connect the four semiconductor detectors 1 within the row. The above matrix wiring is carried out in the initial stage of the wiring operation. This facilitates the required connecting operation. It is only necessary to arrange, on the support substrate, the plurality of semiconductor detectors 1 connected together by the conductive members 2 and 3 and to connect the conductive members 2 and 3 to the corresponding wires (14 and 13), provided on the support substrate. This enables the quick completion of the connections between the electrode films 15 and 17 of the semiconductor detector 1 and the wires on the support substrate.

<<Other Embodiments>>

Description has been given of the radiological imaging apparatus that is a preferred embodiment of the present invention. However, the present invention is not limited to the embodiment or the numerical values described for convenience. Appropriate changes may be made to the embodiment without departing from the spirit of the present invention. For example, such embodiments as described below are possible.

(1) In the embodiment shown in FIG. 10, the radiation detecting section 101 is configured so that the semiconductor detectors 1 are arranged in a 4×4 matrix. The present invention is not limited to this. A radiation detecting section may be used in which the semiconductor detectors 1 are arranged in a m×n (m≧2, n≧2; m and n are natural numbers) matrix.

(2) In place of the electrode films 15 and 17 of the semiconductor detector 1, electrodes 23 and 24 of conductive metal plates may be installed in the semiconductor base material 4 as shown in FIG. 1, with the conductive members 2 and 3 omitted. The electrode 23 is attached to each of the semiconductor base materials 4 in the semiconductor detectors 1 using a conductive adhesive; the semiconductor detectors 1 are included in the radiation detection section and arranged in four rows and four columns. The electrode 24 is shared by the four semiconductor detectors 1 within each row. That is, one electrode 24 is attached to each of the semiconductor detectors 1 in the four semiconductor detectors 1 using a conductive adhesive. Two electrodes 24 adjacent to each other within the column lie opposite each other without being electrically connected. Two electrodes 23 adjacent to each other within the column are joined together using a conductive adhesive and are electrically connected together. The wires 23 may be connected together using a wire. The wire 13 connected to the two shaping amplifiers 12 is connected to the electrode 24. The wire 14 connected to the shaping amplifier 12B is connected to each of the electrodes 23 of the four semiconductor detectors 1 within the column. The semiconductor base material 4 and electrodes 23 and 24 are attached perpendicularly to the other support members, described above. The electrode 24 may be provided for each of the semiconductor detectors 1 rather than being shared by the four semiconductor detectors 1 within each row. In this case, the electrodes 24 of the four semiconductor detectors 1 within the row are connected together by the wires 13.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A radiological imaging apparatus comprising:
a plurality of semiconductor radiation detectors each having a semiconductor member and first and second electrodes provided on the semiconductor member so as to sandwich the semiconductor member between the first and second electrodes, the first electrodes being arranged opposite each other in an arrangement extending in one direction so that the first electrodes are not electrically connected together, the second electrodes being arranged opposite each other in the arrangement extending in one direction so that the second electrodes are electrically connected together in a DC manner;
first waveform shaping devices each provided for the first electrodes of a plurality of the semiconductor radiation detectors within the arrangement to execute a waveform shaping process on an output from each first electrode;
second waveform shaping devices each connected to the second electrodes of a plurality of the semiconductor radiation detectors electrically connected together within the arrangement to execute a waveform shaping process on an output from each second electrode; and
a signal processing device to which outputs from the first waveform shaping devices and second waveform shaping devices are input, and
wherein a shaping time required for the second waveform shaping device to execute the waveform shaping process is set shorter than that required for the first waveform shaping device to execute the waveform shaping process.

2. The radiological imaging apparatus according to claim 1, further comprising:
first preamplifying devices each provided for each of a plurality of the semiconductor radiation detectors within the arrangement and connected to the first electrode, the first preamplifying device amplifying an output from each first electrode; and
second preamplifying devices each connected to each of the second electrodes of a plurality of the semiconductor radiation detectors within the arrangement and amplifying an output from each second electrode, and
wherein the first waveform shaping device is a first waveform shaping and amplifying device to which an output from the first preamplifying device is input, and the second waveform shaping device is a second waveform shaping and amplifying device to which an output from the second preamplifying device is input.

3. The radiological imaging apparatus according to claim 1, wherein the first electrodes and the second electrodes are attached perpendicularly to a support member.

4. The radiological imaging apparatus according to claim 1, wherein a plurality of the semiconductor radiation detectors are arranged within the arrangements in the first direction so that the first electrodes are opposite each other, whereas the second electrodes are opposite each other, and the second electrodes arranged opposite each other are electrically connected together, the second electrodes being electrically connected to other second electrodes that are not opposite each other within the arrangement in the first direction.

5. The radiological imaging apparatus according to claim 1, wherein the first electrodes and the second electrodes are attached perpendicularly to a support member.

6. A radiological imaging apparatus comprising:
a plurality of semiconductor radiation detectors each having a semiconductor member and first and second electrodes provided on the semiconductor member so as to sandwich the semiconductor member between the first and second electrodes, a plurality of arrangements of the semiconductor radiation detectors being arranged in a first direction and a plurality of arrangements of the semiconductor radiation detectors being arranged in a second direction crossing the first direction, the first electrodes being arranged opposite each other in each of the arrangements in the first direction so that the first electrodes are not electrically connected together, the second electrodes being arranged opposite each other in each of the arrangements in the first direction so that the second electrodes are electrically connected together in a DC manner;
first waveform shaping devices each provided for each of the arrangements of the second direction, the first waveform shaping device being connected to the first electrodes of a plurality of the semiconductor radiation detectors electrically connected together within the arrangements in the second direction to execute a waveform shaping process on an output from each first electrode;

second waveform shaping devices each provided for each of the arrangements of the first direction, the second waveform shaping device being connected to the second electrodes of a plurality of the semiconductor radiation detectors electrically connected together within the arrangements in the first direction to execute a waveform shaping process on an output from each second electrode; and a concurrency determining device that identifies the semiconductor radiation detector having detected the radiation on the basis of outputs from the first waveform shaping devices and second waveform shaping devices, and wherein a shaping time required for the second waveform shaping device to execute the waveform shaping process is set shorter than that required for the first waveform shaping device to execute the waveform shaping process.

7. The radiological imaging apparatus according to claim 6, further comprising:

first preamplifying devices each provided for each of the arrangements of the second direction and connected to the first electrode of each of a plurality of the semiconductor radiation detectors within the arrangements in the second direction, the first preamplifying device amplifying an output from the first electrode; and second preamplifying devices each provided for each of the arrangements of the first direction and connected to the second electrode of each of a plurality of the semiconductor radiation detectors within the arrangements in the first direction, the second preamplifying device amplifying an output from the second electrode, and wherein the first waveform shaping device is a first waveform shaping and amplifying device to which an output from the first preamplifying device is input, and the second waveform shaping device is a second waveform shaping and amplifying device to which an output from the second preamplifying device is input.

8. The radiological imaging apparatus according to claim 7, wherein a plurality of the semiconductor radiation detectors are arranged within the arrangements in the first direction so that the first electrodes are opposite each other, whereas the second electrodes are opposite each other, and the second electrodes arranged opposite each other are electrically connected together, the second electrodes being electrically connected to other second electrodes that are not opposite each other within the arrangements in the first direction.

9. The radiological imaging apparatus according to claim 6, wherein the first electrodes of the semiconductor radiation detectors within the arrangements in the second direction are integrated together.

10. The radiological imaging apparatus according to claim 9, wherein a plurality of the semiconductor radiation detectors are arranged within the arrangements in the first direction so that the first electrodes are opposite each other, whereas the second electrodes are opposite each other, and the second electrodes arranged opposite each other are electrically connected together, the second electrodes being electrically connected to other second electrodes that are not opposite each other within the arrangements in the first direction.

11. The radiological imaging apparatus according to claim 6, wherein a plurality of the semiconductor radiation detectors are arranged within the arrangements in the first direction so that the first electrodes are opposite each other, whereas the second electrodes are opposite each other, and the second electrodes arranged opposite each other are electrically connected together, the second electrodes being electrically connected to other second electrodes that are not opposite each other within the arrangements in the first direction.

12. The radiological imaging apparatus according to claim 6, wherein the first electrodes and the second electrodes are attached perpendicularly to a support member.

13. The radiological imaging apparatus according to claim 6, wherein a plurality of the arrangements of said first direction in each of which a plurality of the semiconductor radiation detectors are arranged are arranged in a plurality of rows in the second direction orthogonal to the first direction.

14. The radiological imaging apparatus according to claim 6 wherein the first electrodes and the second electrodes are attached perpendicularly to a support member.

15. A radiological imaging apparatus comprising:

a plurality of semiconductor radiation detectors each having a semiconductor member and first and second electrodes provided on the semiconductor member so as to sandwich the semiconductor member between the first and second electrodes, a plurality of arrangements of the semiconductor radiation detectors being arranged in a first direction and a plurality of arrangements of the semiconductor radiation detectors being arranged in a second direction crossing the first direction, the first electrodes being arranged opposite each other in the arrangement in the first direction so that the first electrodes are not electrically connected together, the second electrodes being arranged opposite each other in the arrangement in the first direction so that the second electrodes are electrically connected together in a DC manner;

first conductive members each provided for each of the arrangements of the second direction and attached to the first electrode of each of the semiconductor radiation detectors within the arrangements, the first conductive member integrating these semiconductor radiation detectors together;

second conductive members each attached to the second electrode of the corresponding one of the plurality of semiconductor radiation detectors;

first waveform shaping devices each provided for each of the arrangements of the second direction to execute a waveform shaping process on an output input by each first electrode via the first conductive member;

second waveform shaping devices each provided for each of the arrangements of the first direction, the second waveform shaping device being connected to the second conductive members electrically connected together within the arrangements in the first direction, the second waveform shaping device executing a waveform shaping process on an output input by each second electrode via the second conductive member; and a concurrency determining device that identifies the semiconductor radiation detector having detected the radiation on the basis of outputs from the first waveform shaping devices and second waveform shaping devices, and wherein a shaping time required for the second waveform shaping device to execute the waveform shaping process is set shorter than that required for the first waveform shaping device to execute the waveform shaping process.

16. The radiological imaging apparatus according to claim 15, further comprising:

first preamplifying devices each provided for the corresponding first conductive member and amplifying an output input by the first electrode via the first conductive member; and second preamplifying devices each provided for each of the arrangements of the first direction and connected to each of the second conductive members within the arrangements in the first direction, the second preamplifying device, the second preamplifying device amplifying an output input by the second electrode via the second conductive member, and wherein the first waveform shaping device is a first waveform shaping and amplifying device to which an output from the first preamplifying device is input, and the second waveform shaping device is a second waveform shaping and amplifying device to which an output from the second preamplifying device is input.

17. The radiological imaging apparatus according to claim 15, wherein a plurality of the semiconductor radiation detectors are arranged within the arrangements in the first direction so that the first electrodes are opposite each other, whereas the second electrodes are opposite each other, and the second electrodes arranged opposite each other are electrically connected together, the second electrodes being electrically connected to other second electrodes that are not opposite each other within the arrangements in the first direction.

18. The radiological imaging apparatus according to claim 15, wherein the first electrodes, the second electrodes, the second conductive member, and the first conductive members are attached perpendicularly to a support member.

19. The radiological imaging apparatus according to claim 15, wherein the first conductive members and the second conductive members are conductive metal plates.

20. The radiological imaging apparatus according to claim 15, wherein a plurality of the arrangements of said first direction in each of which a plurality of the semiconductor radiation detectors are arranged are arranged in a plurality of rows in the second direction orthogonal to the first direction.

* * * * *